US012051428B1

(12) United States Patent
Petrochuk

(10) Patent No.: US 12,051,428 B1
(45) Date of Patent: Jul. 30, 2024

(54) SYSTEM AND METHODS FOR GENERATING REALISTIC WAVEFORMS

(71) Applicant: WellSaid Labs Inc., Seattle, WA (US)

(72) Inventor: Michael Petrochuk, Seattle, WA (US)

(73) Assignee: WellSaid Labs, Inc., Seattle, WA (US)

( * ) Notice: Subject to any disclaimer, the term of this patent is extended or adjusted under 35 U.S.C. 154(b) by 325 days.

(21) Appl. No.: 17/739,642

(22) Filed: May 9, 2022

Related U.S. Application Data

(60) Provisional application No. 63/186,634, filed on May 10, 2021.

(51) Int. Cl.
*G10L 13/02* (2013.01)
*G10L 15/16* (2006.01)
*G10L 19/02* (2013.01)
*G10L 25/30* (2013.01)
*G06N 3/08* (2023.01)

(52) U.S. Cl.
CPC .............. *G10L 19/02* (2013.01); *G10L 15/16* (2013.01); *G10L 25/30* (2013.01); *G06N 3/08* (2013.01)

(58) Field of Classification Search
CPC . G06F 30/367; G06F 3/01; G06F 3/16; G10L 25/30; G10L 13/02; G10L 13/08; G10L 15/16; G10L 19/02; G10L 13/00; G10L 15/063; G06N 3/08
See application file for complete search history.

(56) References Cited

U.S. PATENT DOCUMENTS

| | | | |
|---|---|---|---|
| 10,238,964 B2* | 3/2019 | Komori | A63F 13/28 |
| 2007/0100596 A1* | 5/2007 | Hollis | G06F 30/367 |
| | | | 703/14 |
| 2009/0313019 A1* | 12/2009 | Kato | G10L 17/26 |
| | | | 704/E15.005 |
| 2011/0125496 A1* | 5/2011 | Asakawa | G10L 21/0272 |
| | | | 704/E15.001 |
| 2015/0251089 A1* | 9/2015 | Komori | A63F 13/285 |
| | | | 463/35 |
| 2020/0233499 A1* | 7/2020 | Tkaczuk | G06F 1/1684 |

* cited by examiner

*Primary Examiner* — Jakieda R Jackson
(74) *Attorney, Agent, or Firm* — FisherBroyles LLP; Alan D. Minsk

(57) ABSTRACT

Systems, apparatuses, and methods directed to generating waveforms that can be used to produce realistic sounding speech when used in a speech synthesis or text-to-speech application. In some embodiments, this includes training a neural network model that is part of a generative adversarial network (GAN) to generate the waveform from an input spectrogram, while implementing a specific set of processing stages to determine loss. The loss is used with a back-propagation process to update the weights of the model during a training cycle. In one example use case, text is converted to a spectrogram and the spectrogram is converted to a waveform by a trained model. The output of the model may be used to drive a transducer that converts the waveform to audible sound.

20 Claims, 12 Drawing Sheets

| Name | Value Function |
|---|---|
| GAN | $L_D^{GAN} = E[\log(D(x))] + E[\log(1 - D(G(z)))]$<br>$L_G^{GAN} = E[\log(D(G(z)))]$ |
| LSGAN | $L_D^{LSGAN} = E[(D(x) - 1)^2] + E[D(G(z))^2]$<br>$L_G^{LSGAN} = E[(D(G(z)) - 1)^2]$ |
| WGAN | $L_D^{WGAN} = E[D(x)] - E[D(G(z))]$<br>$L_G^{WGAN} = E[D(G(z))]$<br>$W_D \leftarrow clip\_by\_value(W_D, -0.01, 0.01)$ |
| WGAN_GP | $L_D^{WGAN\_GP} = L_D^{WGAN} + \lambda E[(|\nabla D(\alpha x - (1 - \alpha G(z)))| - 1)^2]$<br>$L_G^{WGAN\_GP} = L_G^{WGAN}$ |
| DRAGAN | $L_D^{DRAGAN} = L_D^{GAN} + \lambda E[(|\nabla D(\alpha x - (1 - \alpha x_p))| - 1)^2]$<br>$L_G^{DRAGAN} = L_G^{GAN}$ |
| CGAN | $L_D^{CGAN} = E[\log(D(x, c))] + E[\log(1 - D(G(z), c))]$<br>$L_G^{CGAN} = E[\log(D(G(z), c))]$ |
| InfoGAN | $L_{D,Q}^{infoGAN} = L_D^{GAN} - \lambda L_I(c, c')$<br>$L_G^{infoGAN} = L_G^{GAN} - \lambda L_I(c, c')$ |
| ACGAN | $L_{D,Q}^{ACGAN} = L_D^{GAN} + E[P(class = c|x)] + E[P(class = c|G(z))]$<br>$L_G^{ACGAN} = L_G^{GAN} + E[P(class = c|G(z))]$ |
| EBGAN | $L_D^{EBGAN} = D_{AE}(x) + \max(0, m - D_{AE}(G(z)))$<br>$L_G^{EBGAN} = D_{AE}(G(z)) + \lambda \cdot PT$ |
| BEGAN | $L_D^{BEGAN} = D_{AE}(x) - k_t D_{AE}(G(z))$<br>$L_G^{BEGAN} = D_{AE}(G(z))$<br>$k_{t+1} = k_t + \lambda(\gamma D_{AE}(x) - D_{AE}(G(z)))$ |

Figure 2(e)

SYSTEM AND METHODS FOR GENERATING REALISTIC WAVEFORMS

CROSS REFERENCE TO RELATED APPLICATION

This application claims the benefit of U.S. Provisional Application No. 63/186,634, entitled "System and Methods for Generating Realistic Waveforms," filed May 10, 2021, the disclosure of which is incorporated, in its entirety (including the Appendix) by this reference.

BACKGROUND

Many processes depend on the ability to generate realistic audio waveforms from input data. Examples of such processes include speech synthesis, text-to-speech conversion, speech-to-speech translation, and processing of other forms of time series data. In each of these examples, a waveform may be generated and input to a process or device (e.g., an amplifier, speaker, etc.) that generates audible sounds (such as words) from the waveform. In other examples, a waveform is generated and then subjected to further processing to identify a characteristic of a source or an aspect of a received signal. As these techniques are used in more types of applications and across industries, it can be beneficial to improve the realism and accuracy of the waveforms generated by the processes. In the example of generating speech, this will help to improve the clarity of the speech, as well as drive the adoption of the techniques for use in a greater number and variety of operational environments, such as interactive voice response (IVR) systems.

In some cases, the application or use case may include a process designed to generate a "realistic" waveform from input text (or from another type of input). The process may include use of a trained model that generates an output waveform from an input spectrogram (a representation of the spectrum of frequencies in a signal), where the input results from converting text into a spectrogram. In some examples, the output waveform is used to "drive" another device (such as a speaker or a speech translation or conversion process). Although using such a model can be effective, training the model can be difficult because the training process may be very sensitive to the form of the input data and the way that the process determines error and updates the model. This is particularly true when the model is a trained neural network where the weights of connections between nodes in different layers may be susceptible to a choice of loss function or other characteristics of the model.

While attempts have been made at generating more realistic waveforms for use in speech synthesis, these attempts have disadvantages with regards to complexity and/or with regards to the inability to create realistic enough waveforms from input data. For example, while some conventional approaches can generate a more realistic or "better" waveform (with regards to some characteristic or metric), they are often unable to produce waveforms that can be used to generate realistic enough speech for a specific application. This is believed to be at least partly because conventional approaches to creating a realistic waveform typically rely on using a generative model with a discriminator, where the discriminator operates to compare a generated waveform to an expected waveform. However, use of a discriminator in this way introduces potential errors because a discriminator is not optimal for evaluating a waveform, as a waveform is a relatively complex source of data and a waveform often does not represent human hearing as well as other types of data, such as a spectrogram. A result is that if a model for generating a waveform incorporates a discriminator, then it may not be able to generate a realistic enough waveform for some uses.

This limitation is believed to be the result of the following two factors, at least in part:
- Conventional solutions are trying to have a model extract and learn relevant features to discriminate between real and fake waveforms. However, a waveform is a physical representation of sound. Unlike a spectrogram, a waveform does not represent human hearing well. In these applications, a spectrogram may be preferred because human hearing is based on a process similar to a real-time spectrogram encoded by the cochlea of the inner ear; and
- A waveform tends to be high-fidelity. It is conventional to have 24,000 samples per second for a 24 kHz audio waveform. A conventional model will struggle to learn patterns with this number of data points.

Due to the limitations inherent in using conventional generative models to generate realistic waveforms for speech synthesis or text-to-speech applications, some approaches have used a spectrogram as an input, with the input then subjected to further processing to convert it to a waveform. While a spectrogram is believed to represent human hearing well, conventional approaches to generating waveforms from spectrograms using a trained generative model with a spectrogram loss term have not produced realistic enough waveforms. This is believed to be because using a measure of the spectrogram loss (which may be described as a measure of how similar two waveforms will "sound" to a person or be perceived) in training the model does not produce a sufficiently accurate output. This may occur because spectrogram loss tends to prioritize large discrepancies between an original and a predicted or expected spectrogram. Unfortunately, this means that small discrepancies are largely ignored, which can result in a faint and unrealistic buzzing in the final audio output. Even if applied to other types of inputs aside from spectrograms, use of a spectrogram loss measure may result in a waveform that is not suited for an intended use.

What is desired are systems, apparatuses, and methods for generating waveforms that can be used to produce realistic sounds for purposes of speech synthesis and similar applications. Embodiments of the disclosure described herein address this and other objectives both individually and collectively.

SUMMARY

The terms "invention," "the invention," "this invention," "the present invention," "the present disclosure," or "the disclosure" as used herein are intended to refer broadly to all the subject matter disclosed in this document, the drawings or figures, and to the claims. Statements containing these terms do not limit the subject matter disclosed or limit the meaning or scope of the claims. Embodiments covered by this disclosure are defined by the claims and not by this summary. This summary is a high-level overview of various aspects of the disclosure and introduces some of the concepts that are further described in the Detailed Description section below. This summary is not intended to identify key, essential or required features of the claimed subject matter, nor is it intended to be used in isolation to determine the scope of the claimed subject matter. The subject matter should be understood by reference to appropriate portions of the entire specification, to any or all figures or drawings, and to each claim.

In some embodiments, the systems, apparatuses, and methods described herein are directed to generating waveforms that can be used to produce realistic sounding speech when used in a speech synthesis or text-to-speech application. In some embodiments, this includes training a neural network model that is part of a generative adversarial network (GAN)[1] to generate the waveform from an input spectrogram, while implementing a specific set of processing stages to determine loss. The loss is used with a back-propagation process (or a different technique for performing a similar feedback process of modifying weights) to update the weights of the model during a training cycle. In one example use case, text is converted to a spectrogram and the spectrogram is converted to a waveform by a trained model. The output of the model may then be used to drive a transducer that converts the waveform to audible sound.

[1] A generative adversarial network (GAN) is a class of machine learning frameworks wherein two neural networks contest with each other in the form of a zero-sum game, where one agent's gain is another agent's loss. Given a training set, this technique learns to generate new data with the same statistics as the training set. Though originally proposed as a form of generative model for unsupervised learning, GANs have also proved useful for semi-supervised learning, fully supervised learning, and reinforcement learning. See Wikipedia entry.

In some embodiments, the input to the trained model may be a tensor that is generated from an image, a spectrogram, an electromagnetic signal, a set of numbers, a set of values generated by encoding other data, etc. The tensor elements may represent specific characteristics of the image or other source of the input data and may be the result of processing the input data using a technique such as filtering, thresholding, mapping, application of a specific mathematical model, etc. In some embodiments, the training approach is used to produce a trained spectrogram-to-waveform model for use with an end-to-end text-to-speech system. Additional sources of input data and possible uses of the output of the trained model will be described herein.

In some embodiments, the model may be what is termed an unconditional model. In this example, the input may be random numbers. In the case of a conditional model, the input is data relevant for driving and controlling the output. In some embodiments described herein, the model uses spectrograms as inputs for driving and controlling the output. In other embodiments, the model may use text, a label, pitch/loudness features of an audio waveform, an image, etc. Note that in image generation, it is most common to condition the model on an "image class" and with "random noise".

Other objects and advantages of the systems and methods disclosed will be apparent to one of ordinary skill in the art upon review of the detailed description and the included figures. Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the present disclosure covers all modifications, equivalents, and alternatives falling within the scope of the appended claims.

BRIEF DESCRIPTION OF THE DRAWINGS

Embodiments of the system and methods in accordance with the present disclosure will be described with reference to the drawings, in which:

FIG. 2(e) is a table or chart illustrating a set of value functions that may be used in training a model that is part of a GAN architecture for the indicated type of GAN;

Note that the same numbers are used throughout the disclosure and figures to reference like components and features.

DETAILED DESCRIPTION

Figure 1:
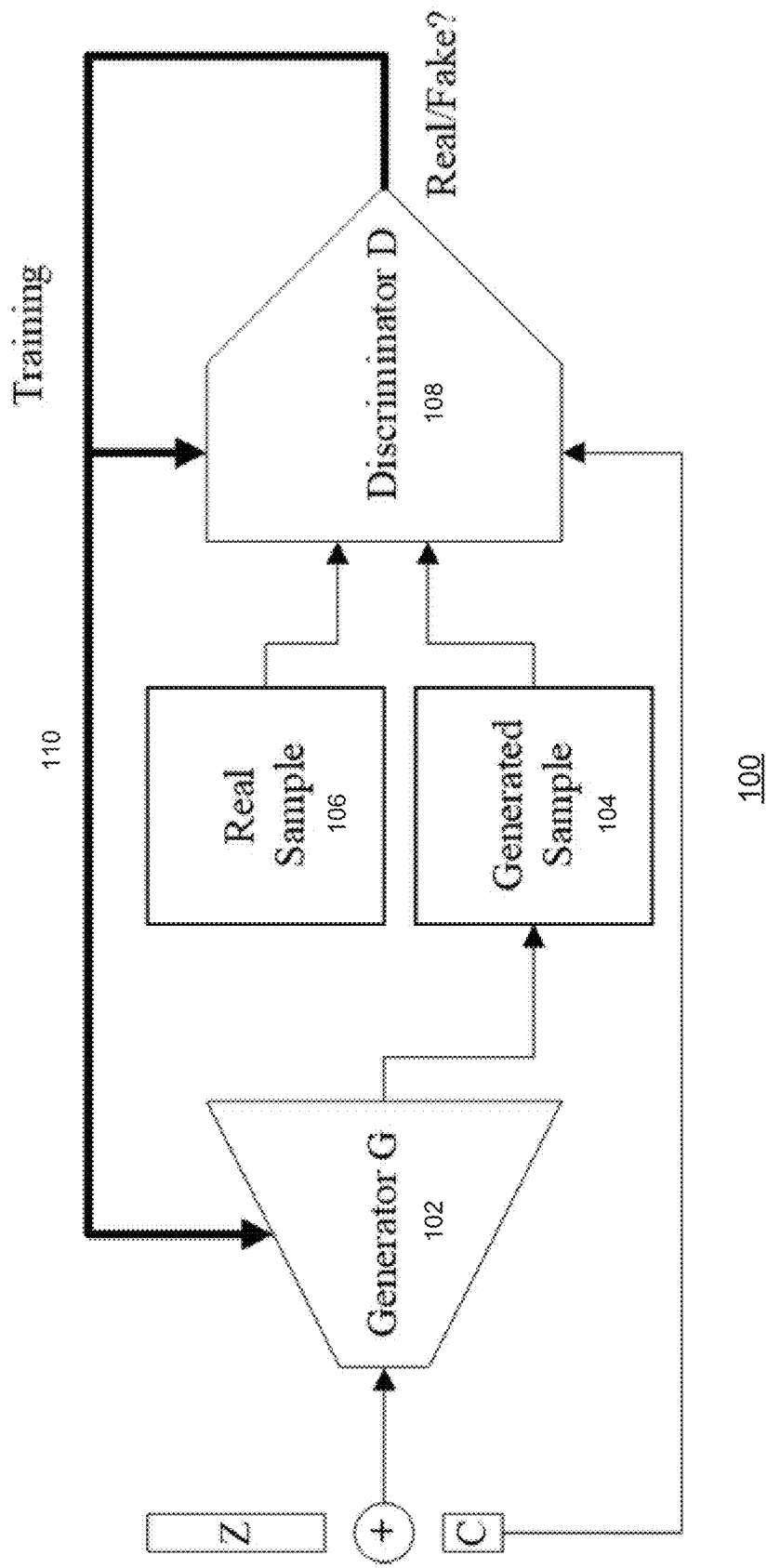
FIG. 1 is a block diagram illustrating the primary components or elements of a conditional GAN (generative adversarial network)

The subject matter of embodiments of the disclosure is described herein with specificity to meet statutory requirements, but this description is not intended to limit the scope of the claims. The claimed subject matter may be embodied in other ways, may include different elements or steps, and may be used in conjunction with other existing or later developed technologies. This description should not be interpreted as implying any required order or arrangement among or between various steps or elements except when the order of individual steps or arrangement of elements is explicitly noted as being required.

Embodiments of the disclosure will be described more fully herein with reference to the accompanying drawings, which form a part hereof, and which show, by way of illustration, exemplary embodiments by which the disclosure may be practiced. The disclosure may, however, be embodied in different forms and should not be construed as limited to the embodiments set forth herein; rather, these embodiments are provided so that this disclosure will satisfy the statutory requirements and convey the scope of the disclosure to those skilled in the art.

Among other things, the present disclosure may be embodied in whole or in part as a system, as one or more methods, or as one or more devices. Embodiments of the disclosure may take the form of a hardware implemented embodiment, a software implemented embodiment, or an embodiment combining software and hardware aspects. For example, in some embodiments, one or more of the operations, functions, processes, or methods described herein may be implemented by one or more suitable processing elements (such as a processor, microprocessor, CPU, GPU, TPU, controller, etc.) that is part of a client device, server, network element, remote platform (such as a SaaS platform), an "in the cloud" service, or other form of computing or data processing system, device, or platform.

The processing element or elements may be programmed with a set of executable instructions (e.g., software instructions), where the instructions may be stored on (or in) one or more suitable non-transitory data storage elements. In some embodiments, the set of instructions may be conveyed to a user through a transfer of instructions or an application that executes a set of instructions (such as over a network, e.g., the Internet). In some embodiments, a set of instructions or an application may be utilized by an end-user through access to a SaaS platform or a service provided through such a platform.

In some embodiments, one or more of the operations, functions, processes, or methods described herein may be implemented by a specialized form of hardware, such as a programmable gate array, application specific integrated circuit (ASIC), or the like. Note that an embodiment of the inventive methods may be implemented in the form of an application, a sub-routine that is part of a larger application, a "plug-in", an extension to the functionality of a data processing system or platform, an API, or other suitable form. The following detailed description is, therefore, not to be taken in a limiting sense.

The systems, apparatuses, and methods disclosed are directed to generating waveforms that can be used to produce realistic sounding speech when used in a speech synthesis or text-to-speech application. In some embodiments, this includes training a neural network model that is part of a generative adversarial network (GAN) to generate the waveform from an input spectrogram, while implementing a specific set of processing stages to determine loss. The loss is used with a back-propagation process (or a different technique for performing a similar feedback process of modifying weights) to update the weights of the model during a training cycle. In one example use case, text is converted to a spectrogram and the spectrogram is converted to a waveform by a trained model. The output of the model may then be used to drive a transducer that converts the waveform to audible sound.

FIG. 1 is a block diagram illustrating the primary components or elements of a conditional GAN 100 (generative adversarial network)[2] that may be used in training a model. A "Random Noise" input is usually termed a "Latent Variable" or "Z". The "C" in the diagram is the "conditional," typically a term, label, classification, category, or data. During image (for example) generation, it is typical for the "conditional" to be an "image class" (i.e., a dog, cat, table, or cup). As suggested by the figure, a Generator G 102 produces a Generated Sample 104 (e.g., a waveform). A Real Sample (e.g., an actual waveform) 106 and the Generated Sample are input to a Discriminator D 108. The Discriminator's task is to determine if the Generated Sample is real or fake (i.e., does it satisfy the conditional, or was it generated and hence "fake"). This is based, in the case of a conditional GAN, on using the conditional "C" as an input to the discriminator. Based on the output of the discriminator, the operation of the generator and/or the discriminator may be modified through a feedback or training loop 110, such as by using a backpropagation technique.

[2] A core idea of a GAN is based on the "indirect" training through a "discriminator", which itself is also being updated dynamically. The result is that the generator is not trained to minimize an error metric, but to fool the discriminator. The generative network generates candidates while the discriminative network evaluates them. Typically, the generative network learns to map from a latent space to a data distribution of interest, while the discriminative network distinguishes candidates produced by the generator from the true data distribution. The generative network's training objective is to increase the error rate of the discriminative network, that is to "fool" the discriminator network by producing novel candidates that the discriminator thinks are not synthesized and are part of the true data distribution.

A known dataset serves as initial training data for the discriminator. Training involves presenting the discriminator with samples from the training dataset, until it achieves acceptable accuracy. The generator trains based on whether it succeeds in fooling the discriminator. Typically, the generator is seeded with randomized input that is sampled from a predefined latent space (e.g., a multivariate normal distribution). Thereafter, candidates synthesized by the generator are evaluated by the discriminator. Independent backpropagation procedures are applied to both networks so that the generator produces better samples, while the discriminator becomes more skilled at flagging synthetic samples. When used for image generation, the generator is typically a deconvolutional neural network, and the discriminator is a convolutional neural network. See Wikipedia entry.

Backpropagation adjusts each weight by calculating the weight's impact on the output—that is, how the output would change if the weight(s) are changed. The impact of a generator weight depends on the impact of the discriminator weights it feeds into. So, in this application of backpropagation or other form of feedback control, backpropagation typically starts at the output and flows back through the discriminator into the generator.

Note that a Discriminator typically does not operate as a binary or other form of classifier, such as to classify an output of a model as either real or "fake". More generally, a Discriminator is a model of a real data distribution and is used to evaluate additional data points that are generated by the Generator. A Generator model uses the Discriminator's evaluation to improve its ability to generate examples which could be considered part of the real data distribution that the Discriminator is modeling.

As will be described with reference to FIGS. 2(a) through 2(d), the disclosed process for training a Generator model to generate "realistic" waveforms may be implemented as part of multiple GAN designs or architectures. The GAN architectures may vary based on the form of conditional provided to the Generator and Discriminator, and the form of input to the Generator.

Figure 2A:
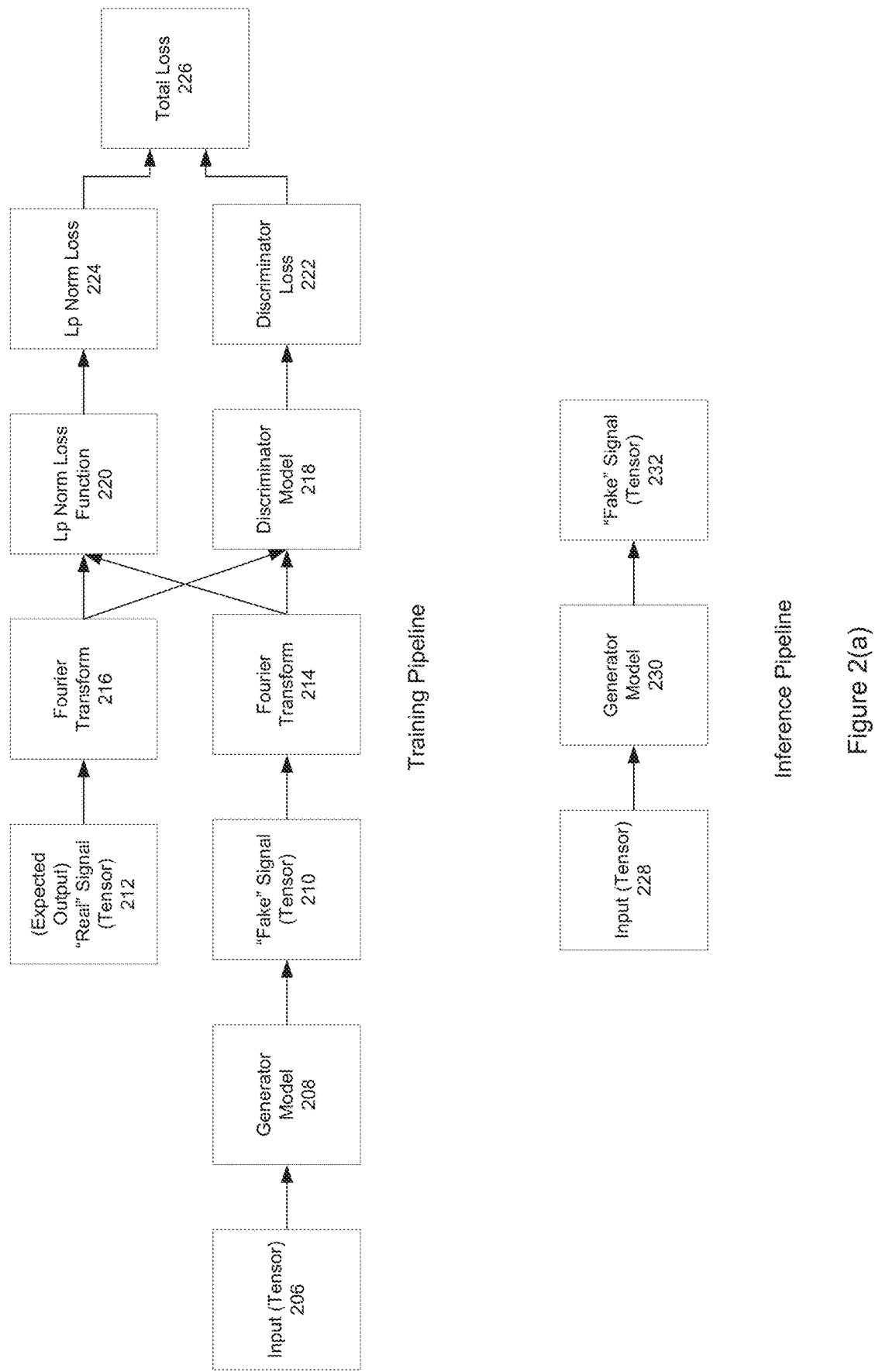
FIG. 2(a) is a block diagram illustrating the primary functions or operations implemented by an example embodiment of the disclosed system, apparatus, and method for training a GAN model (labeled the Generator Model in the figure) to generate a "realistic" waveform in the situation of an expected output.

FIG. 2(a) is a block diagram illustrating the primary functions or operations implemented by an example embodiment of the disclosed system, apparatus, and method for training a GAN model (labelled the Generator Model in the figure) to generate a "realistic" waveform in the situation of an expected output. Here, "expected output" refers to a situation in which the output is of a form or type that is generally expected or known. For example, in text-to-speech, one has a concrete expectation of the text that is read and the speaker who is speaking. As shown in the figure, the overall architecture or system includes a training pipeline 202 and an inference (or production) pipeline 204.

When trained, a Generator Model 230 (which may be a recurrent neural network (RNN) or convolutional neural network (CNN)) operates on input data in the form of a tensor (which in one example, may have been obtained from a spectrogram generated by a text-to-spectrogram processing technique) to generate an output tensor (which in one example, may represent an audio waveform). The output waveform generated by the model is such that that when it is used to drive an audio transducer (e.g., a speaker), the sounds a person hears will be perceived as a more realistic representation of the input to the inference pipeline than are capable of being produced using conventional approaches to training a Generator. This is because, at least in part, the system and methods described incorporate a stage to determine an error or control signal for the training process from both a discriminator-based loss and a spectrogram-based (or Lp-Norm)[3] loss measure.

[3] For a real number p≥1, the p-norm or Lp-norm of x is defined by: $\|x\|_p = (|x_1|^p + |x_2|^p + \ldots + |x_n|^p)^{1/p}$.

As part of the disclosed training process, the output waveform from the Generator model being trained (indicated as "Fake Signal (Tensor) 210" in the figure) is processed using a Short-time Fourier Transform[4] (or other suitable signal processing technique, such as a cosine transform) to generate a spectrogram. As mentioned, a spectrogram is a better representation of how human hearing perceives sounds. Similarly, the real/expected signal (indicated as "Real Signal (Tensor) 212" in the figure, and which may be an audio segment represented as a waveform) is also processed by a Short-time Fourier Transform for purposes of generating a spectrogram that may be compared to the spectrogram obtained from transforming the waveform generated by the model (Fake Signal 210).

[4] A Short-time Fourier transform (STFT) is a Fourier-related transform used to determine the sinusoidal frequency and phase content of local sections of a signal as it changes over time. In practice, a procedure for computing STFTs is to divide a longer time signal into shorter segments of equal length and then compute the Fourier transform separately on each shorter segment. This reveals the Fourier spectrum on each shorter segment. See Wikipedia entry.

The two spectrograms that result from application of the Fourier or other transform to each of the real waveform and fake waveform are then used to determine a Lp-Norm loss term 224 (via Lp-Norm Loss Function 220) and are also both used as inputs to Discriminator Model 218. Discriminator Model 218 generates a Discriminator Loss term 222, which is combined with Lp-Norm Loss 224 to produce Total Loss term 226. Total Loss term 226 may then be used as a control signal in a feedback loop or back-propagation process to modify the weights assigned to connections between nodes in layers of Generator Model 208 and/or Discriminator Model 218.

The Discriminator loss term represents an approximation to the error between the Generator output and the real data distribution (such as a spectrogram of a real audio signal). In the area of Deep Learning, a loss term typically is represented by a single number or a Tensor. There are multiple ways to calculate a Discriminator loss, with non-limiting examples shown in FIG. 2(e). Although the Lp loss term can be combined with the Discriminator loss term using multiple types of mathematical operations, typically it is combined using an addition operation between two loss term values.

As will be described, an aspect of the disclosed model training pipeline is to utilize a Fourier transform before applying the discriminator model and then use the discriminator to evaluate if a generated "fake" waveform is "realistic". The discriminator output is then used as one contribution to a total loss term or factor, with the other part of the total loss factor being a Lp-Norm based loss derived from considering the transformed representations of a "real" and a "fake" signal. In some embodiments, the discriminator neural network weights may be updated as part of a feedback mechanism from processing both "fake" and "real" waveforms that have been transformed by a Fourier transform.[5]

[5] The Discriminator uses the "real" signal in order to update its understanding of the "true data distribution". It then uses updated weights to evaluate the "fake" signal, and to produce a loss value for updating the Generator model.

In the inference pipeline 204, the input tensor 228 may represent a signal, a spectrogram generated from a text-to-spectrogram process, an image, a waveform, or a set of time-series data, as non-limiting examples. In the case of a waveform generated from a spectrogram input to a model that is trained using the disclosed technique, the output tensor represents a "realistic" waveform, that is, one that is more similar to how a person would hear or perceive the input (such as text) if spoken by a real person. This has a benefit of producing spoken text that is more likely to be accepted and understood by a human listener, and without the potentially jarring impact of a mechanical or "fake" sounding voice.

In one sense, the output of a model trained using an embodiment of the disclosed process (such as a spectrogram, waveform, or image) is more "realistic" in that the trained Discriminator is unable to tell the difference (i.e., to discriminate) between a generated waveform (that is a "fake" waveform) and a real waveform generated from an actual person speaking (or depending on the input format, a sampled image of a real object, etc.). Note that in some embodiments, the intermediate data format of a spectrogram serves as a proxy for the input and one that better represents how a person would perceive sound.

The Discriminator in the described system operates to make a waveform generated by the Generator Model more similar to one that when converted to sounds, would be perceived as "realistic" by a human ear and how the human brain processes sound. From one perspective, the described system and methods train a model to generate a realistic waveform by using the intermediate stage of converting data to a spectrogram to control the training process (such as by being used in determining loss signals).

The approach of using a spectrogram is implemented in some embodiments because (similar to the operation of a human ear) a spectrogram converts a waveform into different frequency intervals and their corresponding loudness (intensity), and therefore better represents the response of human hearing to an input sound. By using a comparison between a spectrogram representation of both a real and a generated waveform, and the two forms of loss (spectrogram and discriminator), the training process described herein can produce a trained Generator Model that more accurately generates waveforms that correspond to how a person perceives sounds.

The disclosed approach may be used for a model (such as a Generator in a GAN) which translates an input into an output that can then be processed with a Fourier transform, cosine transform or similar processing technique. In general, the output of the Generator is a "signal" that can be processed by a Fourier Transform or similar mathematical operation. In one of the embodiments described, the model takes in a spectrogram as an input and predicts a waveform as the output. The waveform is processed by a Fourier transform to produce a spectrogram. The spectrogram is then passed to a Discriminator.

In some embodiments, the training pipeline 202 may include the following stages or steps:

Provision of a set of training data, where each example of training data is a spectrogram and is used as an input to a model (indicated as Generator Model 208 in the figure) being trained;
- In some embodiments, this may be a spectrogram generated by a text-to-spectrogram model (such as Tacotron-2);
- In other embodiments, the input may represent an image, a set of values obtained by processing an image, or a set of values obtained from a source, as non-limiting examples;

The input to the model may be in the form of a tensor 206;
- The model being trained 208 may be in the form of a Deep Neural Network (DNN), such as a recurrent neural network (RNN) or a convolutional neural network (CNN);
  - In one example embodiment, the DNN is a spectrogram-to-waveform model, such as the MelGAN generator model (described in MelGAN: Generative Adversarial Networks for Conditional Waveform Synthesis, Kumar et. al., arXiv:1910.06711);

The Generator Model 208 generates an output tensor (a "fake" or generated signal in the form of a tensor) 210 from the input tensor 206. In one example, tensor 210 represents a waveform predicted from the input 206 (where, as mentioned, the input may be a spectrogram);

To improve the Generator Model 208 (i.e., to set and modify weights associated with connections between nodes in different layers of the model), a comparison is performed between the output tensor 210 and a tensor representation of an expected or real waveform 212;
- In some embodiments, the expected (real) signal 212 is a tensor representing a waveform obtained from a text-to-speech dataset, for example LJ Speech (a public domain speech dataset consisting of 13,100 short audio clips of a single speaker reading passages from 7 non-fiction books, and where a transcription is provided for each clip);

In some embodiments, this comparison is used to determine the error or loss between the generated signal tensor 210 and the real signal tensor 212;
- The error or loss term(s) are used as a control signal in an adaptive feedback loop or back-propagation process to modify the weights between nodes in the neural networks used to represent the Generator Model and/or Discriminator Model;
- In some embodiments, prior to determining the error or loss term(s) model, each of the generated signal tensor (representing the generated waveform) 210 and the real signal tensor 212 are subjected to further processing;
  - In some embodiments, this further processing is a short-time Fourier Transform (STFT), illustrated as functions, operations, or modules 214 and 216;[6]

[6] ASTFT processes the signal in chunks, usually a chunk of length 50 milliseconds. A Fourier Transform would process the entire signal, at one time. In text-to-speech, where there are a number of distinctive sounds made, it is preferable to process the signal in chunks. In a signal that is continuous, such as an image, a regular FFT can be used. A difference between using the two forms of Fourier Transform is that the error term is calculated based on either distinctive intervals or on the entire signal. Note that a STFT can become a FFT if the window length is long enough.

This processing operates to convert or transform each of the tensor representations of waveforms into a spectrogram, which as mentioned is a more accurate representation of human hearing or human ear responsiveness;
- In some embodiments, the spectrogram(s) may be further processed into a Mel Spectrogram, log Mel Spectrogram, or mel-frequency cepstrum;[7]

[7] The Mel Scale, mathematically speaking, is the result of a non-linear transformation of the frequency scale. The Mel Scale is constructed such that sounds of equal distance from each other on the Mel Scale, also "sound" to humans as if they are equal in distance from one another.

The transformed waveforms (the output of processing 214 and 216) are then used to determine two types of "loss", with the total loss representing a difference or control signal for adjusting the weights of the deep neural network(s);
- In some embodiments, each of the transformed outputs (e.g., the spectrograms generated by processes 214 and 216) is provided as an input to both a process to determine L1 or L2 loss 220 and to a Discriminator Model 218 (here operating as a form of binary classifier to determine if an input is real or fake);
- The resulting output of the process to determine L1 or L2 loss represents the Lp-Norm (which may be referred to as the spectrogram loss for example) 224 and the resulting output of the Discriminator represents Discriminator Loss 222;
  - (Note that instead of (or in addition to) L1 or L2 loss, another form of Lp-norm loss may be used;
- The Lp-Norm Loss 224 and Discriminator Loss 222 are combined to generate the Total Loss 226 from the training cycle (as mentioned, this is typically done by using an addition operation, although other combination methods may be used, such as a weighted sum, a fit to a polynomial, or a fit to a formula, as non-limiting examples);
- The Total Loss 226 is then used to update or modify the weights set during the training cycle, typically through back-propagation (although other adaptive or feedback techniques may be used).

Once the weights have converged to sufficiently stable values, the Generator Model 208 may be considered trained and the trained model 230 may be used as part of an inference pipeline 204. In a typical use, an input tensor 228 may be provided to the trained model 230. In response, the model 230 will operate to generate or produce as an output a tensor 232 representing a realistic waveform or other form of tensor corresponding to the training process.

Figure 2B:
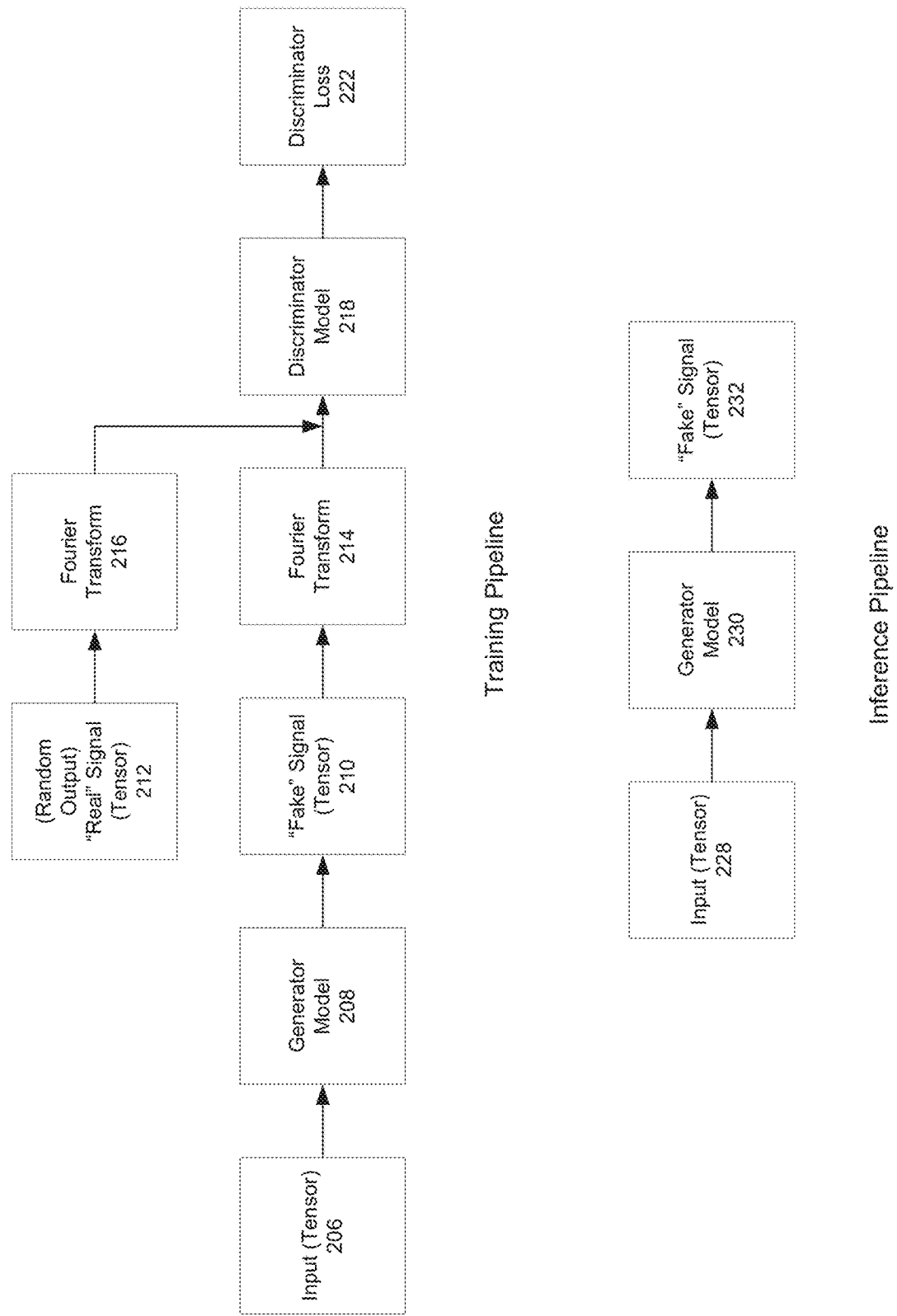
FIG. 2(b) is a block diagram illustrating the primary functions or operations implemented by an example embodiment of the disclosed system, apparatus, and method for training a GAN model (labeled the Generator Model in the figure) to generate a "realistic" waveform in the situation of a random output.

FIG. 2(b) is a block diagram illustrating the primary functions or operations implemented by an example embodiment of the disclosed system, apparatus, and method for training a GAN model (labelled the Generator Model in the figure) to generate a "realistic" waveform in the situation of a random output. Here, "random output" refers to a situation in which, the Generator Model may generate an image or a sound, without regard to a specific input or expectation, sampled from the learned dataset distribution.[8] As an example, in this situation, a model trained on faces may produce a random face. As shown in the figure, in this embodiment of using the described training process, the loss term for the real signal is not calculated (since it would not represent a useful quantity) and only the Discriminator Loss term 222 is used in determining a loss value in a feedback process to improve the Generator Model 208.

[8] A "generator model" has learned to model the "dataset distribution". Afterwards, one can "sample" from the "learned distribution" to generate the output.

A difference between the architectures illustrated in FIGS. 2(a) and 2(b) is the inclusion of the "Lp Norm Loss" term in FIG. 2(a). The "Lp Norm Loss" is helpful for "guiding" the Generator model to generate a specific output. For example, in a text-to-speech application, one is seeking to generate a specific voice-over (a voice-over that says a predetermined piece of text and that sounds like a particular speaker) and one that is "realistic" sounding to a human ear. The "Lp Norm Loss" helps to generate the specific voice-over, and the use of the "Discriminator loss" helps to ensure that the generated voice-over also sounds realistic to the human ear and auditory processing system.

Figure 2C:
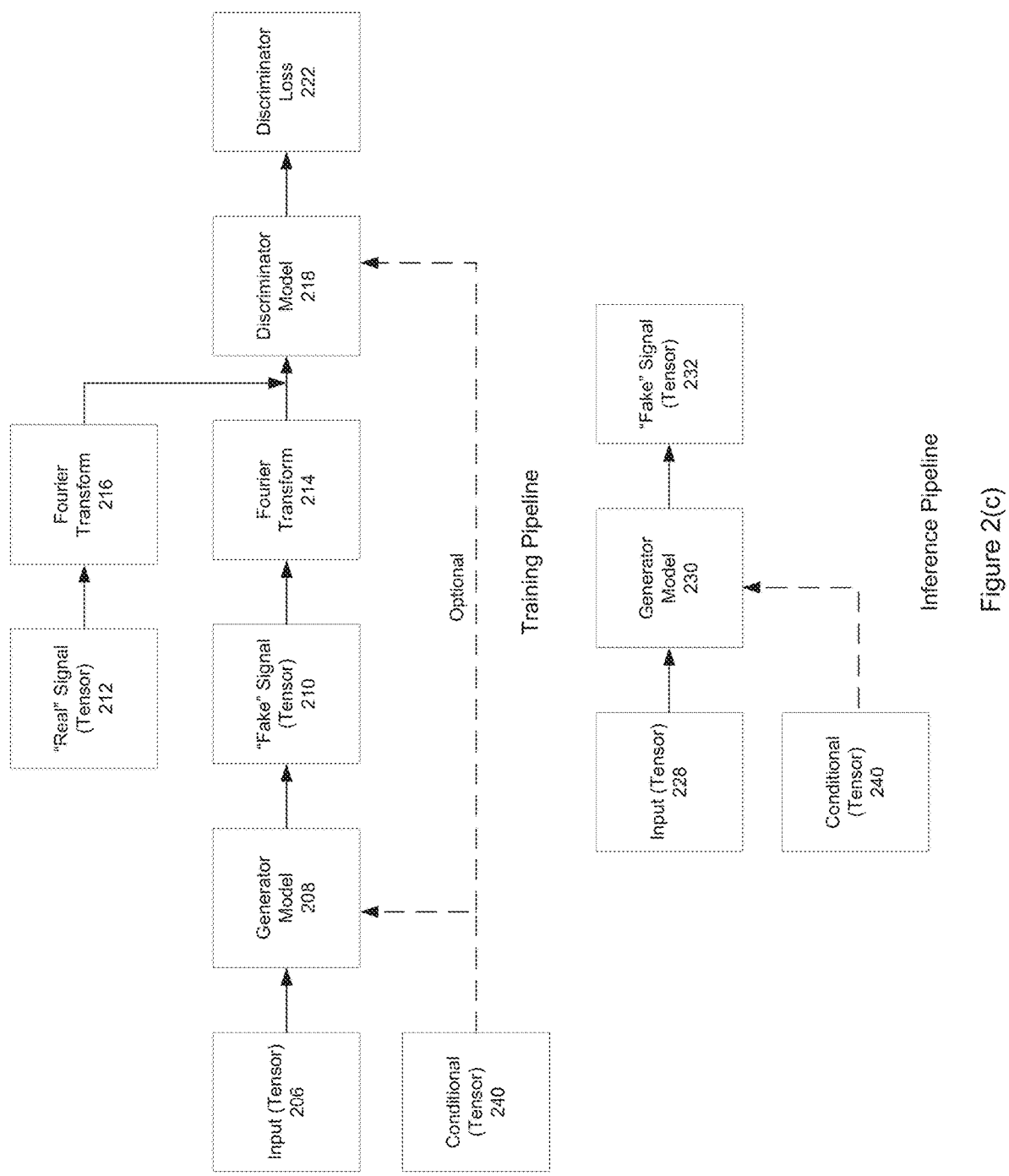
FIG. 2(c) is a block diagram illustrating the primary functions or operations implemented by an example embodiment of the disclosed system, apparatus, and method for training a GAN model (labeled the Generator Model in the figure) to generate a "realistic" waveform in the situation of a conditional random output.

FIG. 2(c) is a block diagram illustrating the primary functions or operations implemented by an example embodiment of the disclosed system, apparatus, and method for training a GAN model (labelled the Generator Model in the figure) to generate a "realistic" waveform in the situation of a conditional random output. Here, "conditional random output" refers to a situation in which the output is partially expected or known. For example, in image generation a conditional may be a general label, such as "dog" or "cat". The Generator Model may then be trained to generate any dog or cat, with any lighting, with any position, and with any fur color.[9]

[9] The tutorial: https://pytorch.org/tutorials/beginner/dcgan_faces_tutorial.html, provides information to assist in implementing certain components of the processing pipeline. Further, a tutorial that discusses implementing a conditional GAN is found at: https://medium.com/@utk.is.here/training-a-conditional-dc-gan-on-cifar-10-fce88395d610. Further, the following article may assist in implementing a Fourier transform for an Image Signal, https://arxiv.org/pdf/1907.06515.pdf.

FIG. 2(c) illustrates a situation in which additional information is included with the "input", in the form of a "conditional". For example, in image processing, a conditional might be an image class, such as "dog". In text-to-speech, a conditional might be a speaker the model is trying to mimic. The conditional processing can be included in either FIG. 2(a) or FIG. 2(b). FIG. 2(c) illustrates how a conditional can be added to the architecture of FIG. 2(b).

As shown in FIG. 2(c), in this embodiment of the training process a conditional in the form of a tensor 240 is an optional input to Generator Model 208 and/or to Discriminator Model 218. The conditional 240 provides additional information for the Generator and Discriminator to use in the training process.

Figure 2D:
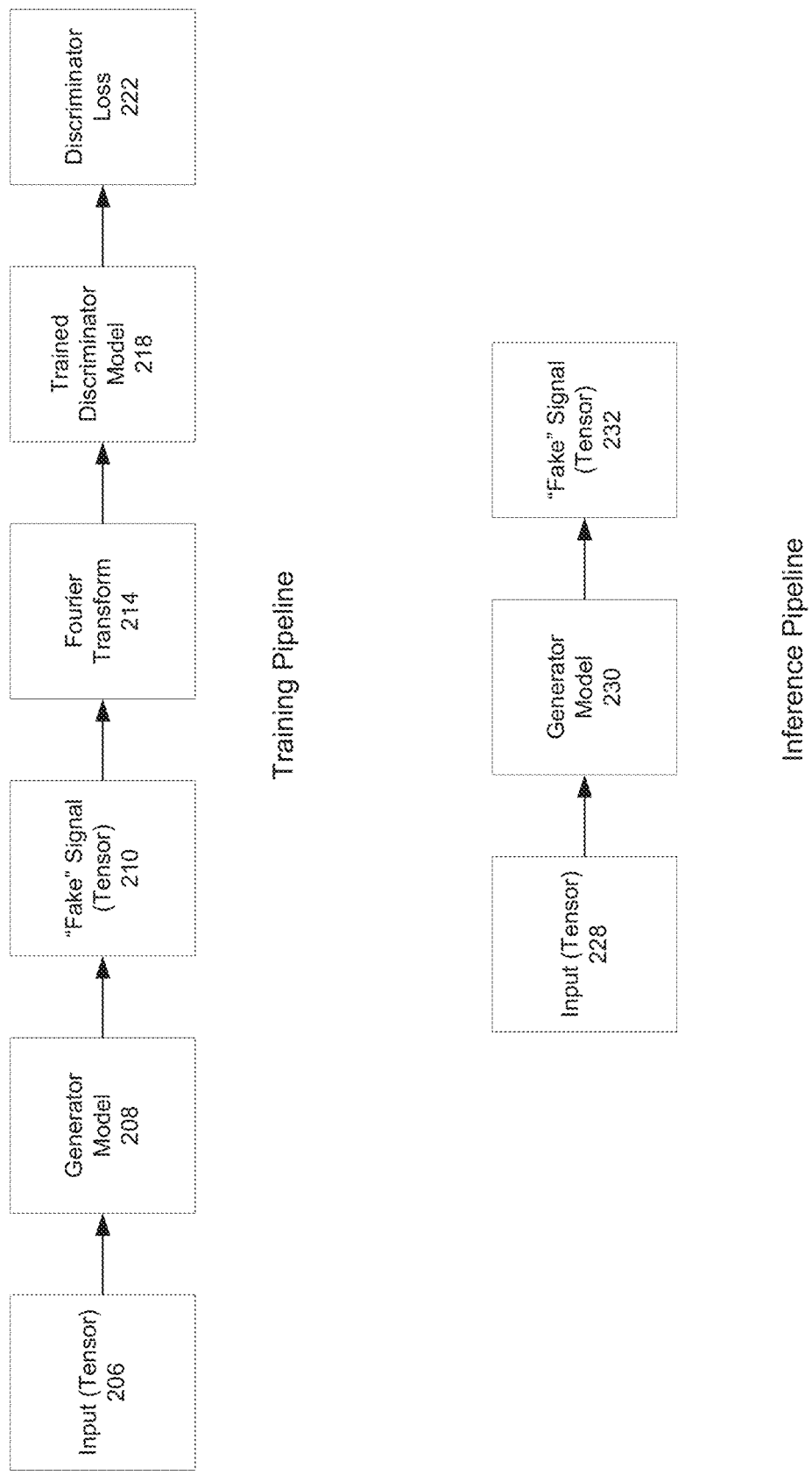
FIG. 2(d) is a block diagram illustrating the primary functions or operations implemented by an example embodiment of the disclosed system, apparatus, and method for training a GAN model (labeled the Generator Model in the figure) to generate a "realistic" waveform in the situation of using a pre-trained Discriminator.

FIG. 2(d) is a block diagram illustrating the primary functions or operations implemented by an example embodiment of the disclosed system, apparatus, and method for training a GAN model (labelled the Generator Model in the figure) to generate a "realistic" waveform in the situation of using a pre-trained Discriminator. As suggested by the figure, in this example implementation of the disclosed training process, Discriminator Model 218 does not receive a form of a real signal as an input and generates Discriminator Loss term 222, which is then used as an error or control term for modifying Generator Model 208. In this example, Discriminator Model 218 may be based on a pre-trained model which accepts a spectrogram as an input.

As indicated by the implementations of the disclosed processing flow shown in FIGS. 2(a) through 2(d), embodiments of the disclosed training process may be utilized to assist in training Generator Models using multiple types of GAN network architectures. In each case, the techniques described may be used to improve the training process and produce a trained model that can generate a more "realistic" waveform, where realistic refers to a characteristic or characteristics of the waveform such that when the waveform is used to generate sounds, those sounds would be perceived by the human ear as a real set of spoken sounds. As mentioned, an embodiment of the disclosure may also be applied to other types of data, such as for image processing, where it can be used to ensure that image signals are more realistic.

FIG. 2(e) is a table or chart illustrating a set of value functions that may be used in training a model that is part of a GAN architecture for the indicated type of GAN. The value function represents a term that may be used as part of an adaptive feedback or control process to update the weights in the Generator (the model being trained) and/or Discriminator and may be a function of one or more of the fake data, the Discriminator's evaluation of the fake data, or the Discriminator's evaluation of the real data, as non-limiting examples. The table or chart illustrates the conventional cost functions used as part of training a GAN model and represent examples of "error" terms that may be used when training a GAN network. Note that in some cases, there may be two types of errors, Generator error (Lg) used in training the Generator and Discriminator error (Ld) used in training the Discriminator. In some cases, the Discriminator may be "fixed" and does not require further training.

Figure 3A:
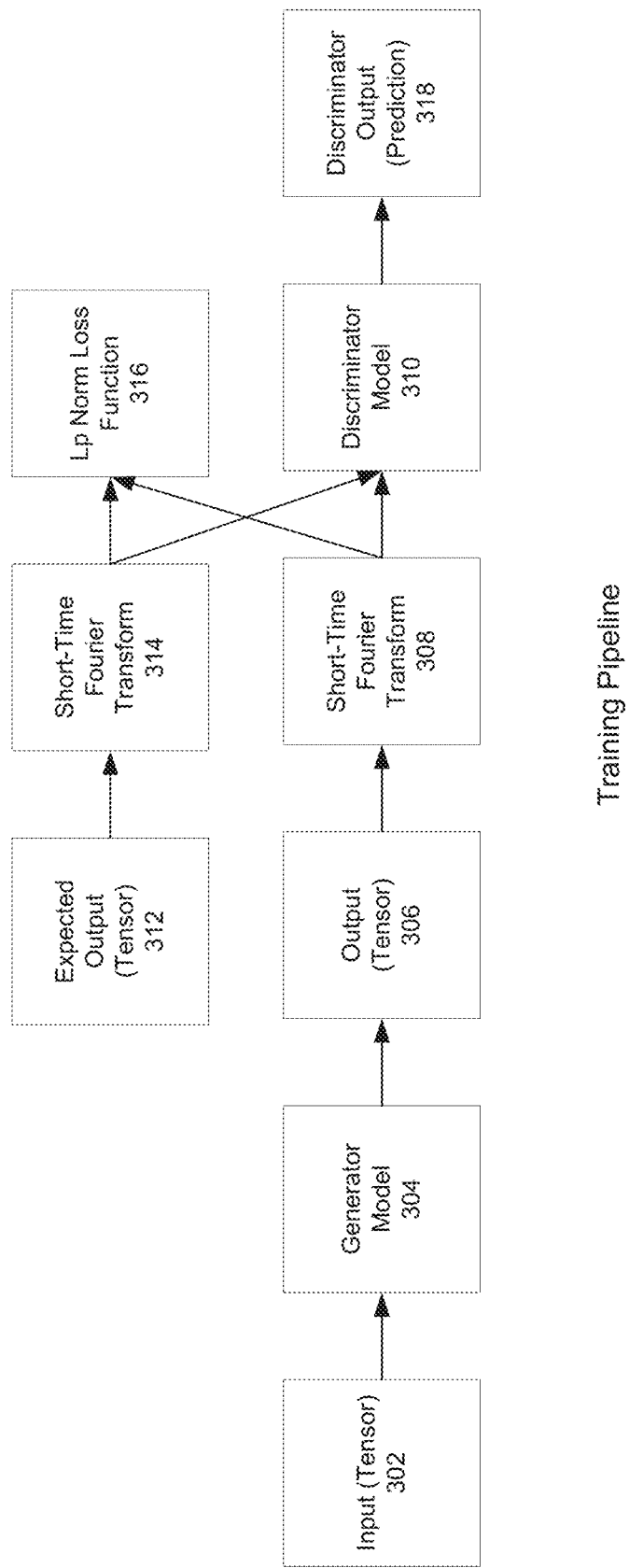
FIG. 3(a) is a diagram illustrating the primary functions or operations implemented by an example embodiment of the disclosed system, apparatus, and method for training a GAN model (labeled the Generator Model in the figure) to generate a "realistic" waveform.

FIG. 3(a) is a diagram illustrating the primary functions or operations implemented by an example embodiment of the disclosed system, apparatus, and method for training a GAN model (labelled the Generator 304 in the figure) to generate a "realistic" waveform. As shown in the figure, an input in the form of a tensor 302 is provided to a neural network or other form of model operating as a Generator 304. In some embodiments, the values of the tensor may be obtained or derived from sources that include but are not limited to an image, a video, a document, a string of text, a sampled waveform, random numbers, a spectrogram, or sensor data, and where the data may be subjected to processing steps that may include conversion, transformation, filtering, sampling, or thresholding prior to being used to construct the input tensor.

Generator 304 operates or processes input tensor 302 to produce an output tensor 306. Output tensor 306 is then processed into a form (such as by processing using a Short-time Fourier Transform (STFT) 308) in which it may be used to determine an error or error terms for use in training the Generator 304 and/or a Discriminator model 310. An expected output (such as an audio waveform generated by a real person) 312 in the form of a tensor is also processed using a Short-time Fourier Transform (STFT) 314.

The results of performing the Short-time Fourier Transform (314) processing on the Expected Output 312 (suggested by the arrow from STFT 314) and on the Generator output 306 (suggested by the arrow from STFT 308) are provided to a process that determines a L1 or L2 loss factor 316, or other form of Lp-norm loss. The results of performing the Short-time Fourier Transform processing on the Expected Output 312 and on the Generator output 306 are also provided to Discriminator 310. Discriminator 310 attempts to determine if the output 306 from Generator 304 is real or fake, as suggested by process 318.

Based on the result of process 318, an error term or other form of control signal may be provided in a feedback loop to alter the operation of Generator 304 and/or Discriminator 310 until Generator 304 has been trained sufficiently to output "realistic" versions of the desired data or information.

Figure 3B:
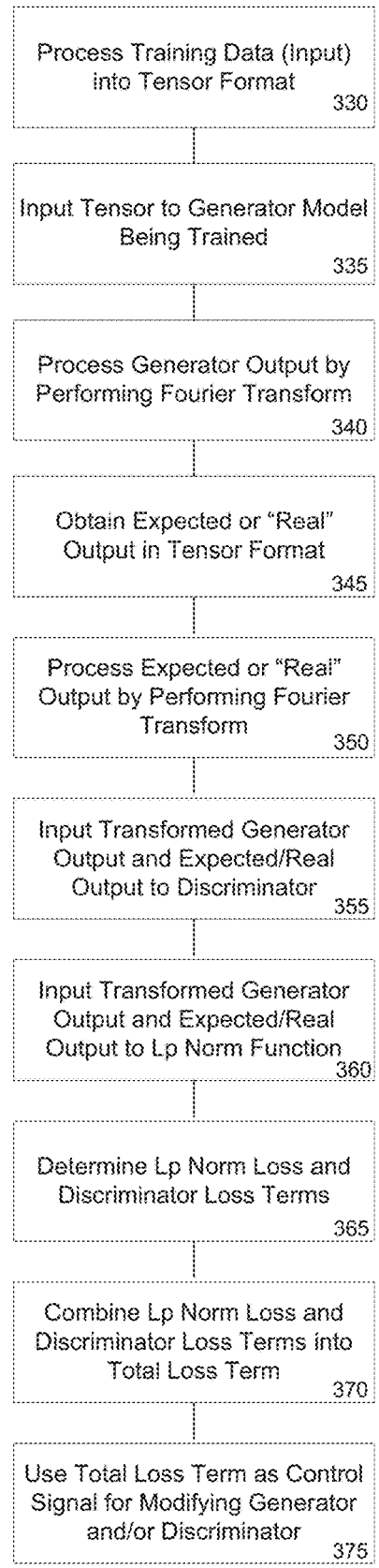
FIG. 3(b) is a flowchart or flow diagram illustrating a process, method, set of operations, or set of functions for training a model, such as a Generator that is part of a GAN architecture to generate a "realistic" waveform, in some embodiments.

FIG. 3(b) is a flowchart or flow diagram illustrating a process, method, set of operations, or set of functions for training a model, such as a Generator that is part of a GAN architecture to generate a "realistic" waveform, in some embodiments. As shown in the figure, in one embodiment, a process for training a model to generate realistic waveforms using a GAN architecture may comprise the following steps or stages:

- Process Training Data (Input) into a Tensor Format (as suggested by step or stage 330);
  - In one embodiment, the train data may represent a spectrogram, with the tensor elements representing the intensity or amplitude as a function of frequency bin;
- Input the Tensor Representing the Training Data to a Generator Model Being Trained (as suggested by step or stage 335);
  - In one embodiment, the Generator or other form of model being trained may be in the form of a deep neural network;
  - Depending upon the form and source of the training data, the deep neural network may be a convolutional neural network, a recurrent neural network, or a multi-layer perceptron;
  - In one embodiment, the output of the Generator may be a waveform;
- Obtain the Output of the Generator and Process the Output by Performing a Fourier Transform on the Output (as suggested by step or stage 340);
  - This may operate to convert or transform the output into a spectrogram, for example;
  - The Fourier transform may be a short-time Fourier transform, or other form of similar transform;
  - In some embodiments, a different form of converting the model output into a spectrogram or similar format may be used and may include a cosine transform, as a non-limiting example;
- Obtain a Real or Expected Output of the Model and Process (if needed) into Tensor Format (as suggested by step or stage 345);
  - As an example, in one embodiment, the real or expected output is a waveform;
- Process the Real or Expected Output by Performing a Fourier Transform on the Real or Expected Output (as suggested by step or stage 350);
  - In the case where a process other than a Fourier transform is used to process the model output, that same process should be applied to the Real or Expected Output;
- Input the Transformed Generator Output and the Transformed Expected/Real Output to a Discriminator (as suggested by step or stage 355);
- Input the Transformed Generator Output and the Transformed Expected/Real Output to a Lp Norm (or other error metric) Function (as suggested by step or stage 360);
- Determine the Lp Norm Loss and the Discriminator Loss Terms (as suggested by step or stage 365);
- Combine the Lp Norm Loss and Discriminator Loss Terms into a Total Loss Term (as suggested by step or stage 370);
- Use the Total Loss Term as a Control Signal for Modifying Generator and/or Discriminator Weights or Parameters (as suggested by step or stage 375);
  - In some embodiments, the total error term may be used as part of a back-propagation or other form of feedback or adaptive control process to modify the weights between nodes or layers in the Generator, and in some cases those of the Discriminator.

Although embodiments have been described with reference to text-to-speech or speech synthesis applications, it is noted that there are other possible applications of the training process(es) described. Further, as mentioned, in some embodiments, the input to a Generator model is a tensor, where the values of the tensor may be obtained or derived from sources that include but are not limited to an image, a video, a document, a string of text, a sampled waveform, random numbers, a spectrogram, a set of data generated by a system, or sensor data, as examples, and where the data may be subjected to processing steps that may include conversion, transformation, filtering, sampling, or thresholding prior to being used to construct the input tensor. As non-limiting examples:

- The described training pipeline can be used with other models that translate an input into an output, where the output can be processed further by applying a Fourier transform;
  - In the example described, the model uses a spectrogram as an input and "predicts" a waveform as the output. The waveform is then processed by a Fourier transform to produce a spectrogram. The spectrogram is then passed to a Discriminator;
  - As examples, an input tensor may be generated from many types of sources, including but not limited to:
    - audio waveforms;
    - processed images or scans (including photographs, x-rays, MRI, ultrasound, etc.);
    - processed text (e.g., after application of an optical character recognition (OCR) process);
    - time-series signals from radar or sonar devices;
    - light or sound output by a device;
    - sensor measurements (e.g., heartbeat, pulse, brain waves);
    - wireless communication signals;
    - signals generated by seismological events;
    - signals obtained from processing financial data;
    - random numbers representing "noise";
  - The output is a signal or format that can be processed with a Fourier transform. For example, an image, waveform, or time-series forecast represent outputs that may be processed;
    - The output may be in the form of one of the inputs mentioned, and the output of the trained model may be used to represent a "realistic" form of a wave, signal, trend, or other type of data (such as by generating more realistic signals of a type being processed for purposes of system testing, system evaluation, or error correction, as non-limiting examples);
- The Deep Neural Network (DNN) (typically comprised of one RNNs or CNNs, or a combination of the two architectures and may include other layers, such as an Attention layer or a Feedforward layer) or model should be compatible with the input and output forms;
- The described solution enables the generation of realistic waveforms. This capability may be used for text-to-speech conversion or speech-to-speech conversion, musical-notes-to-music conversion, or noise-to-speech applications;
  - Thus, embodiments are generally applicable to a use case or problem which requires generating an audio signal (waveform);

The described approach may also be applied to generating "realistic images". This could be an improvement over conventional approaches used for this purpose, as synthetic images tend to have spectra that are not realistic[10];

[10] For example, the following paper describes how to detect fake images through their spectra: https://arxiv.org/pdf/2003.08685.pdf). See also https://arxiv.org/pdf/1907.06515.pdf.

For example, the disclosed technique could be applied to generate realistic images that are likely to be undetectable by the method described in the paper referenced in the footnote below;

Although there are GAN models that have been used to generate synthetic time series data, the approach described herein may be used to generate more realistic synthetic time series data—this data could be used for training detection systems, or calibrating devices and systems, as examples.

In general, embodiments may be used for improving the results obtained by conventional signal and image processing techniques that may be applied in the following contexts:

speech synthesis, text-to-speech processing, image processing to detect the presence or absence of a feature or movement, to generate video, to detect false signals, to provide simulations of physical phenomena, to generate handwriting, for radar or sonar signal processing, etc.;

other applications of the techniques and methods disclosed herein include the following:

Audio signal processing—for electrical signals representing sound, such as speech or music;

Image processing—in digital cameras, computers, and various imaging systems;

Video processing—for interpreting a set of images;

Wireless communication—for waveform generations, demodulation, filtering, equalization applications;

Control systems and associated signals derived from sensed waveforms;

Array processing—for processing signals from arrays of sensors;

Process control—here a variety of signals are used, including the industry standard 4-20 mA current loop;

Seismology applications;

Financial signal processing—analyzing financial data using signal processing techniques, such as for prediction purposes;

Feature extraction, such as image understanding and speech recognition;

Signal quality improvement, such as by noise reduction, image enhancement, or echo cancellation;

Source coding, including audio compression, image compression, and video compression; and Genomic signal processing.

Figure 4:
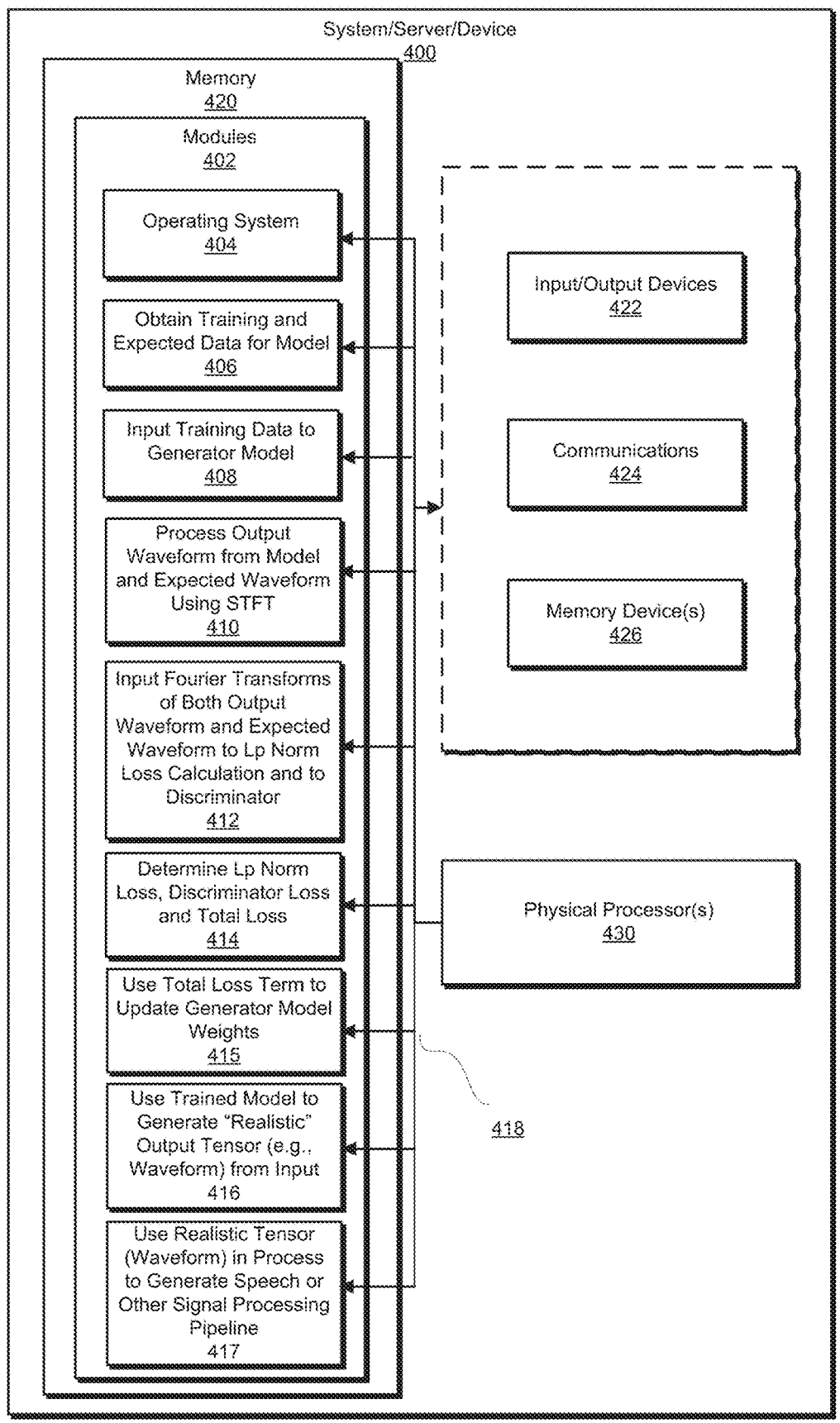
FIG. 4 is a diagram illustrating elements or components that may be present in a computer device or system configured to implement a method, process, function, or operation in accordance with some embodiments.

FIG. 4 is a diagram illustrating elements or components that may be present in a computer device or system configured to implement a method, process, function, or operation in accordance with an embodiment of the system and methods disclosed herein. As noted, in some embodiments, the system and methods may be implemented in the form of an apparatus that includes a processing element and set of executable instructions. The executable instructions may be part of a software application and arranged into a software architecture. In general, an embodiment may be implemented using a set of software instructions that are designed to be executed by a suitably programmed processing element (such as a GPU, CPU, microprocessor, processor, controller, computing device, etc.). In a complex application or system such instructions are typically arranged into "modules" with each such module typically performing a specific task, process, function, or operation. The entire set of modules may be controlled or coordinated in their operation by an operating system (OS) or other form of organizational platform.

Each application module or sub-module may correspond to a particular function, method, process, or operation that is implemented by the module or sub-module. Such function, method, process, or operation may include those used to implement one or more aspects of the disclosed system and methods.

The application modules and/or sub-modules may include any suitable computer-executable code or set of instructions (e.g., as would be executed by a suitably programmed processor, microprocessor, or CPU), such as computer-executable code corresponding to a programming language. For example, programming language source code may be compiled into computer-executable code. Alternatively, or in addition, the programming language may be an interpreted programming language such as a scripting language.

The application modules and/or sub-modules may contain one or more sets of instructions for performing a method or function described with reference to the Figures, and the descriptions of the functions and operations provided in the specification. These modules may include those illustrated but may also include a greater number or fewer number than those illustrated. As mentioned, each module may contain a set of computer-executable instructions. The set of instructions may be executed by a programmed processor or processors contained in a server, client device, network element, system, platform, or other component.

A module may contain instructions that are executed by a processor contained in more than one of a server, client device, network element, system, platform or other component. Thus, in some embodiments, a plurality of electronic processors, with each being part of a separate device, server, or system may be responsible for executing all or a portion of the software instructions contained in an illustrated module. Thus, although FIG. 4 illustrates a set of modules which taken together perform multiple functions or operations, these functions or operations may be performed by different devices or system elements, with certain of the modules (or instructions contained in those modules) being associated with those devices or system elements.

As shown in FIG. 4, system 400 may represent a server or other form of computing or data processing system, platform, or device. Modules 402 each contain a set of executable instructions, where when the set of instructions is executed by a suitable electronic processor or processors (such as that indicated in the figure by "Physical Processor(s) 430"), system (or server, platform, or device) 400 operates to perform a specific process, operation, function or method. Modules 402 are stored in a memory 420, which typically includes an Operating System module 404 that contains instructions used (among other functions) to access and control the execution of the instructions contained in other modules. The modules 402 stored in memory 420 are accessed for purposes of transferring data and executing instructions by use of a "bus" or communications line 418, which also serves to permit processor(s) 430 to communicate with the modules for purposes of accessing and executing a set of instructions. Bus or communications line 418 also permits processor(s) 430 to interact with other elements of system 400, such as input or output devices 422, communications elements 424 for exchanging data and information with devices external to system 400, and additional memory devices 426.

Although the following description of the functions of the modules is with reference to a use case of a text-to-speech conversion process, as mentioned, the methods and techniques disclosed herein may be used as part of other data, signal, or image processing pipelines. The following is provided for purposes of an example and is not intended to limit or restrict the functions that may be implemented by execution of the software instructions in each module.

For example, Obtain Training and Expected Data for Model Module 406 may contain computer-executable instructions which when executed by a programmed processor cause the processor or a device in which it is implemented to acquire, access, or otherwise obtain training data and expected data (or desired output data) for use in training a deep learning model, such as a Generator that is part of a GAN. As described with reference to FIGS. 3(*a*) and 3(*b*), the input data may take the form of a tensor, such as a spectrogram generated by a text-to-spectrogram model. The expected data is also in the form of a tensor and may be obtained from a waveform obtained from a text-to-speech dataset.

Input Training Data to Generator Model Module 408 may contain computer-executable instructions which when executed by a programmed processor cause the processor or a device in which it is implemented to input the training data tensors to the deep learning or other model and obtain an output tensor. The Generator model may be a neural network, and in some examples may be a recurrent neural network (RNN) or a convolutional neural network (CNN).

Process Output Waveform from Model and Expected Waveform Using STFT Module 410 may contain computer-executable instructions which when executed by a programmed processor cause the processor or a device in which it is implemented to process each of the output tensor generated by the model and the expected tensor using a Fourier transform, such as a short-time Fourier Transform, although other types of such transforms or signal processing techniques may be used to obtain a frequency domain representation.

Input Fourier Transforms of Both Output Waveform and Expected Waveform to Lp Norm Loss Calculation and to Discriminator Module 412 may contain computer-executable instructions which when executed by a programmed processor cause the processor or a device in which it is implemented to perform a calculation or operation to determine each of two loss terms, a Lp Norm loss (e.g., L1, L2, or other form) and a Discriminator loss term, with each loss term based on a combination of both the transform of the output waveform from the Generator and the transform of the expected waveform.

Determine Lp Norm Loss, Discriminator Loss and Total Loss Module 414 may contain computer-executable instructions which when executed by a programmed processor cause the processor or a device in which it is implemented to determine the (spectrogram) loss from the output of the Lp-norm loss calculation, determine the discriminator loss from the output of the discriminator loss calculation, and determine a total loss by combining the two loss terms. The combination may be through addition, scaling, fitting to a polynomial or curve, a weighted combination, or other suitable technique.

Use Total Loss to Update Model Weights Module 415 may contain computer-executable instructions which when executed by a programmed processor cause the processor or a device in which it is implemented to use the total loss term determined by the output of module 414 as a control measure or signal (typically in a feedback loop) for updating the weights of the Generator model (and in some cases the Discriminator). Use Trained Model to Generate "Realistic" Output Tensor (e.g., Waveform) from Input Module 416 may contain computer-executable instructions which when executed by a programmed processor cause the processor or a device in which it is implemented to receive a new input tensor or set of tensors (i.e., data not used in the training process and which may result from pre-processing of a spectrogram, image, or other form of signal) and to process that input using the trained model to generate an output tensor. This use of the trained model is as part of an inference pipeline, as illustrated in FIG. 2(*a*).

Use Realistic Tensor (Waveform) in Process to Generate Speech or Other Signal Processing Pipeline Module 417 may contain computer-executable instructions which when executed by a programmed processor cause the processor or a device in which it is implemented to use the output of the trained model as a source for a process that generates an audio signal (e.g., speech sounds via an audio transducer), a visual signal (video), or another representation of the output waveform or tensor using a specific signal processing flow.

Figure 5:
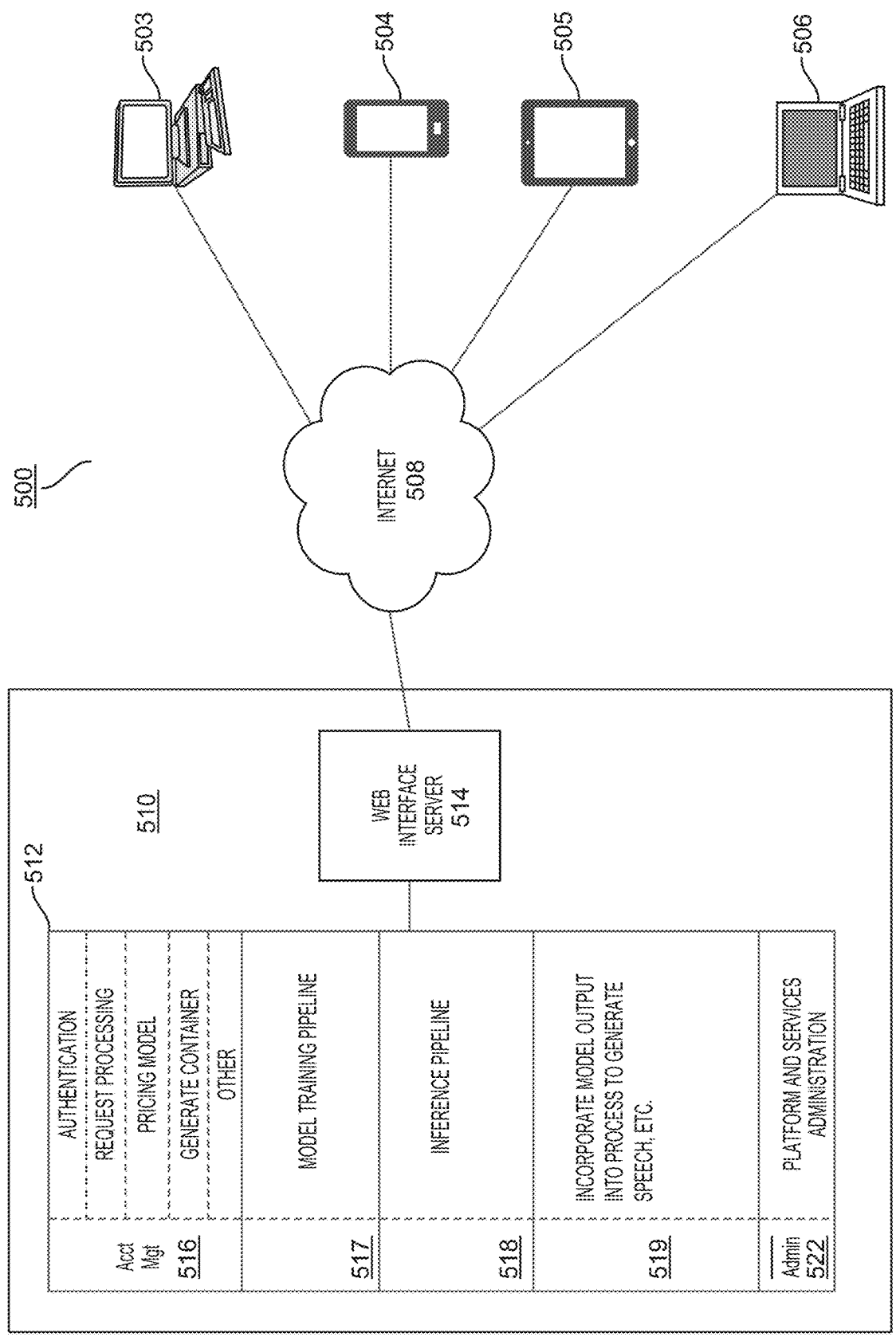
FIGS. 5-7 are diagrams illustrating an architecture for a multi-tenant or SaaS platform that may be used in implementing an embodiment of the systems and methods disclosed herein.
Figure 6:
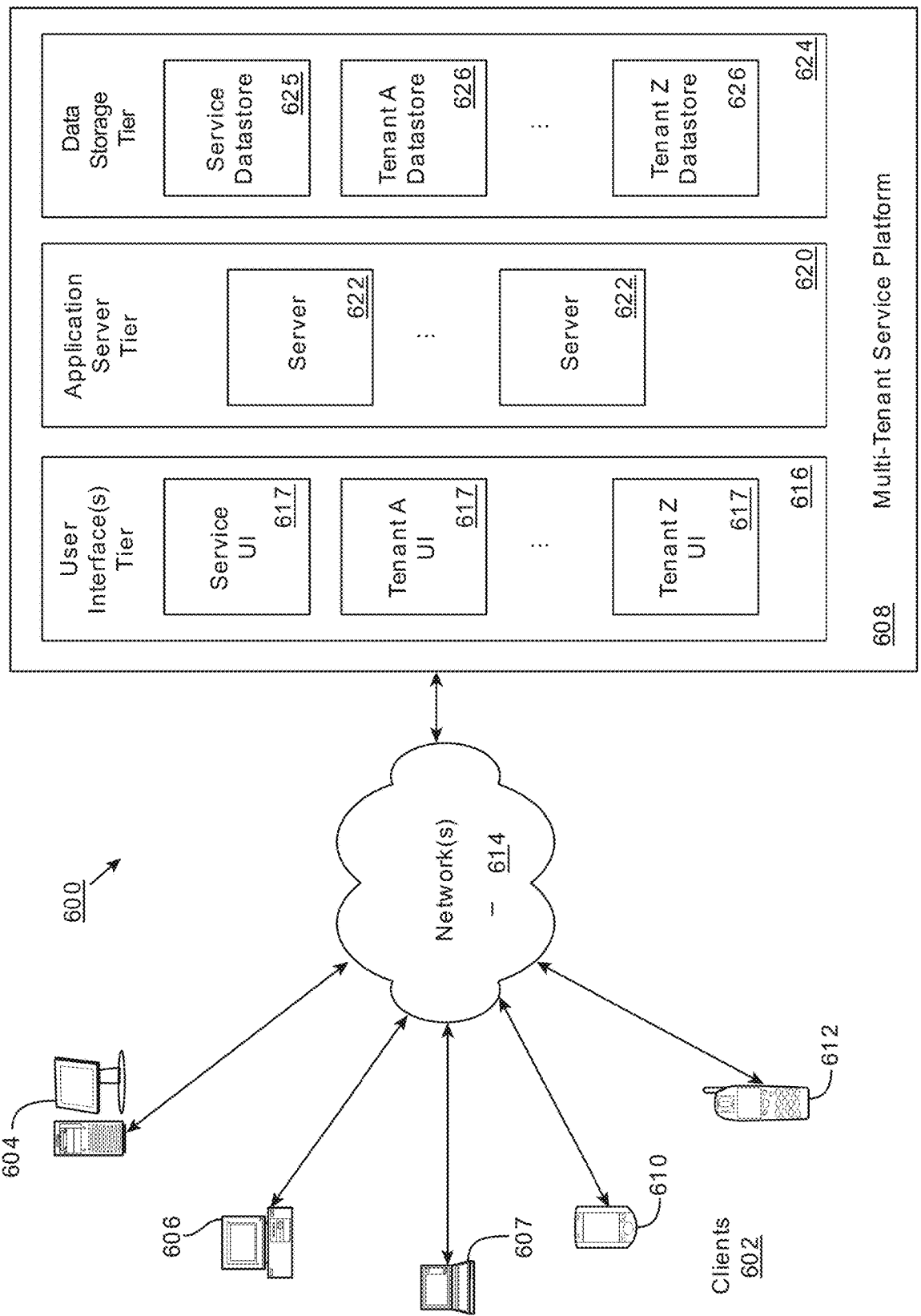
Figure 7:
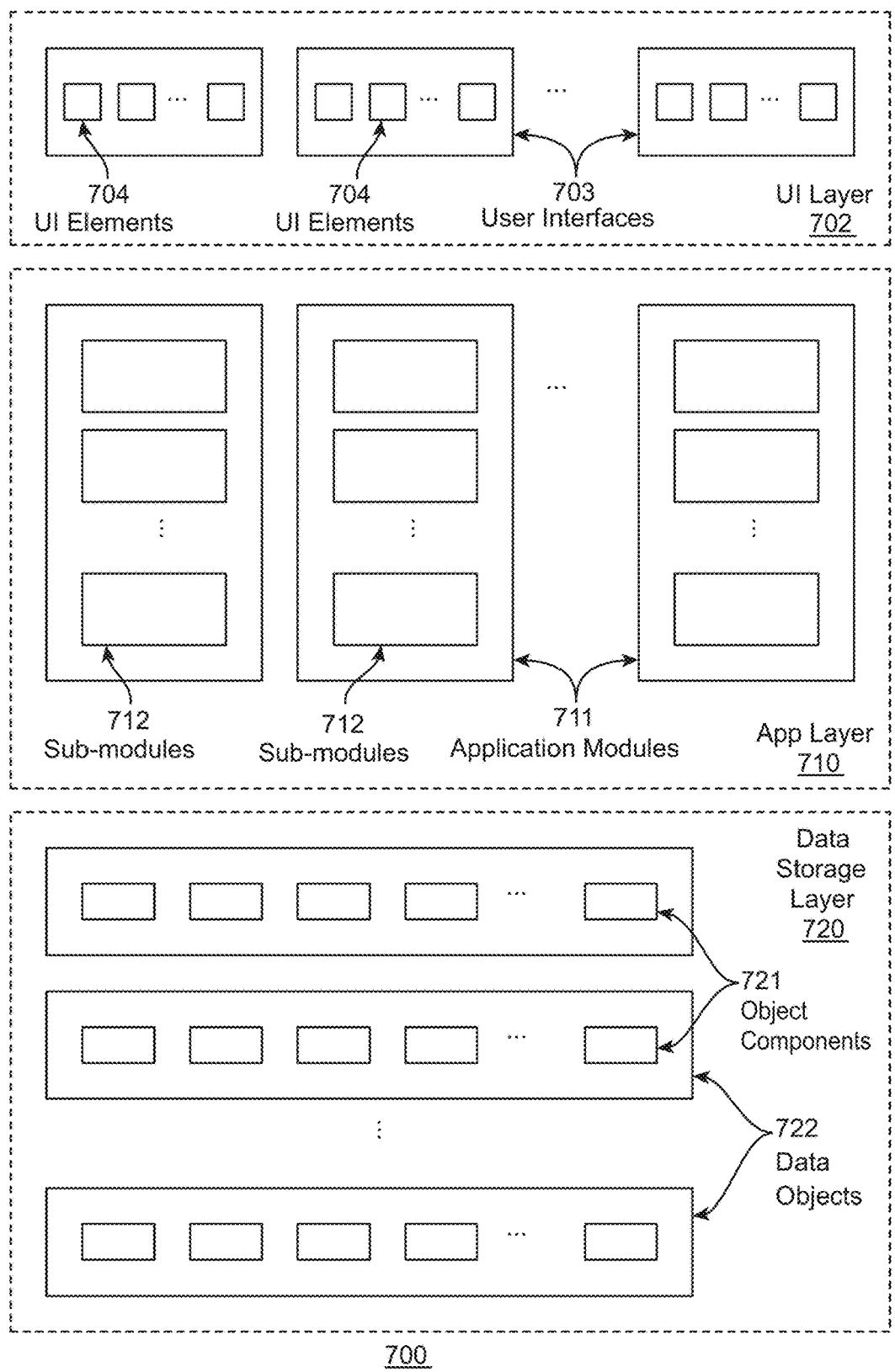

In some embodiments, the functionality and services provided by the system and methods described herein may be made available to multiple users by accessing an account maintained by a server or service platform. Such a server or service platform may be termed a form of Software-as-a-Service (Saas). FIG. 5 is a diagram illustrating a SaaS system in which an embodiment of the invention/disclosure may be implemented. FIG. 6 is a diagram illustrating elements or components of an example operating environment in which an embodiment of the invention/disclosure may be implemented. FIG. 7 is a diagram illustrating additional details of the elements or components of the multi-tenant distributed computing service platform of FIG. 6, in which an embodiment of the invention/disclosure may be implemented.

In some embodiments, the system or service(s) disclosed herein may be implemented as micro-services, processes, workflows, or functions performed in response to a user request to process a set of input data, such as an input tensor. The micro-services, processes, workflows, or functions may be performed by a server, data processing element, platform, or system. In some embodiments, the services may be provided by a service platform located "in the cloud". In such embodiments, the platform is accessible through APIs and SDKs. The described model training services may be provided as micro-services within the platform for each of multiple users, use cases, or companies. The interfaces to the micro-services may be defined by REST and GraphQL endpoints. An administrative console may allow users or an administrator to securely access the underlying request and response data, manage accounts and access, and in some cases, modify the processing workflow or configuration.

Note that although FIGS. 5-7 illustrate a multi-tenant or SaaS architecture that may be used for the delivery of business-related or other applications and services to multiple accounts/users, such an architecture may also be used to deliver other types of data processing services and provide access to other applications. For example, such an architecture may be used to provide the waveform/tensor processing and model training functions and capabilities described herein, as well as using the model output as part of another process. Although in some embodiments, a platform or system of the type illustrated in FIGS. 5-7 may be operated by a 3rd party provider to provide a specific set of business-related applications, in other embodiments, the platform may be operated by a provider and a different business may provide the applications or services for users through the platform. For example, some of the functions and services described with reference to FIGS. 5-7 may be provided by a 3rd party with the provider of the training process and/or trained models maintaining an account on the platform for each company or business using a trained model to provide services to that company's customers.

FIG. 5 is a diagram illustrating a system 500 in which an embodiment of the invention may be implemented or through which an embodiment of the services described herein may be accessed. In accordance with the advantages of an application service provider (ASP) hosted business service system (such as a multi-tenant data processing platform), users of the services described herein may comprise individuals, businesses, stores, organizations, etc. A user may access the services using any suitable client, including but not limited to desktop computers, laptop computers, tablet computers, scanners, smartphones, etc. In general, any client device having access to the Internet may be used to provide a request or text message requesting customer support services and to receive and display an intent tree model. Users interface with the service platform across the Internet 508 or another suitable communications network or combination of networks. Examples of suitable client devices include desktop computers 503, smartphones 504, tablet computers 505, or laptop computers 506.

System 510, which may be hosted by a third party, may include a set of services 512 and a web interface server 514, coupled as shown in FIG. 5. It is to be appreciated that either or both of services 512 and web interface server 514 may be implemented on one or more different hardware systems and components, even though represented as singular units in FIG. 5. Services 512 may include one or more functions or operations for the model training and inference processes described herein.

In some embodiments, the set of applications available to a company or user may include one or more that perform the functions and methods described herein for the training of a model to generate a specific form of output tensor or waveform and the use of the trained model to generate a more "realistic" waveform, signal, or image. As discussed and as a non-limiting example, these functions or processing workflows may be used to provide a more "realistic" waveform for purposes of driving an audio transducer as part of a text-to-speech or speech synthesis application.

As examples, in some embodiments, the set of applications, functions, operations or services made available through the platform or system 510 may include:
account management services 516, such as
  a process or service to authenticate a person or user wishing to access the data processing services available through the platform (such as credentials or proof of purchase, verification that the customer has been authorized to use the services, etc.);
  a process or service to receive a request for generating a desired form of output tensor or waveform from one or more input tensors representing a spectrogram, a sampled image, an output of an executed process, or other form of signal;
  an optional process or service to generate a price for the requested service or a charge against a service contract;
  a process or service to generate a container or instantiation of the desired signal processing and related techniques for the user, where the instantiation may be customized for a particular user or account; and
  other forms of account management services.
a process or service 517 for training a model (in the form of a Generator that is part of a GAN) to operate on an input tensor representing a spectrogram, image, or other form of signal to produce a more "realistic" tensor as an output, where the training process may include:
  A process to receive a set of training data, where each example of training data is a spectrogram and is used as an input to the model being trained;
    In some embodiments, this may be a spectrogram generated by a text-to-spectrogram model (such as Tacotron-2);
    The input to the model may be in the form of a tensor;
  The model being trained may be in the form of a Deep Neural Network (DNN), such as a recurrent neural network (RNN) or a convolutional neural network (CNN);
  The model generates an output tensor from the input tensor. In one example, this is a waveform predicted from the input;
  To improve the model (i.e., to set and modify weights associated with connections between nodes in different layers of the model), a comparison is performed between the output tensor and the expected or desired output;
    In some embodiments, the expected output is a waveform obtained from a text-to-speech dataset, for example UJ Speech;
    In some embodiments, this comparison is used to determine the error or loss between the output tensor and the expected output tensor;
    In some embodiments, prior to determining the error or loss, each of the output waveform and the expected waveform (expressed as tensors) are subjected to further processing;
      In some embodiments, this further processing is a short-time Fourier Transform (STFT);
    The transformed waveforms are then used to determine two types of "loss", with the total loss representing a difference or control signal for adjusting the weights of the neural network;
      In some embodiments, each of the transformed waveforms is provided as an input to both a process to determine a Lp Norm loss (for example, L1 or L2 loss) and a Discriminator loss (a form of binary classifier, with the loss term expressed as a cost function, such as those illustrated in FIG. 2(e));
      The resulting output of the process to determine L1 or L2 loss represents the Lp Norm loss, and the resulting output of the Discriminator represents Discriminator Loss;
    The Lp Norm Loss and Discriminator Loss are combined to generate the Total Loss from the training cycle;
      In one embodiment, the two loss terms are added to generate the total loss term, although as noted, other forms of combining the two terms may be used;
    The Total Loss is then used to update or modify the weights set during the training cycle, typically through backpropagation (although other feedback or adaptive techniques may be used);

a process or service 518 for using the trained model with new input data in an inference pipeline;

as an example, once the model weights (such as those connecting nodes in layers of the network/model) have converged to sufficiently stable values, the model may be considered trained;

the trained model may be used as part of the inference pipeline. In a typical use, an input tensor may be provided to the trained model. In response, the model will operate to generate or produce as an output a tensor representing a realistic waveform (or other form of tensor corresponding to the training data and what it represents);

In some embodiments, the output tensor may then be used as part of a process or service 519 that converts text-to-speech, generates synthetic speech, generates an image having specific characteristics, processes a signal to identify a signal characteristic or interpret the signal, etc.; and administrative services 522, such as a process or services to enable the provider of the model training and inference pipelines and/or the platform to administer and configure the processes and services provided to users.

The platform or system shown in FIG. 5 may be hosted on a distributed computing system made up of at least one, but likely multiple, "servers." A server is a physical computer dedicated to providing data storage and an execution environment for one or more software applications or services intended to serve the needs of the users of other computers that are in data communication with the server, for instance via a public network such as the Internet. The server, and the services it provides, may be referred to as the "host" and the remote computers, and the software applications running on the remote computers being served may be referred to as "clients." Depending on the computing service(s) that a server offers it could be referred to as a database server, data storage server, file server, mail server, print server, web server, etc. A web server is a most often a combination of hardware and the software that helps deliver content, commonly by hosting a website, to client web browsers that access the web server via the Internet.

FIG. 6 is a diagram illustrating elements or components of an example operating environment 600 in which an embodiment of the invention may be implemented. As shown, a variety of clients 602 incorporating and/or incorporated into a variety of computing devices may communicate with a multi-tenant service platform 608 through one or more networks 614. For example, a client may incorporate and/or be incorporated into a client application (e.g., software) implemented at least in part by one or more of the computing devices. Examples of suitable computing devices include personal computers, server computers 604, desktop computers 606, laptop computers 607, notebook computers, tablet computers or personal digital assistants (PDAs) 610, smart phones 612, cell phones, and consumer electronic devices incorporating one or more computing device components, such as one or more electronic processors, microprocessors, central processing units (CPU), or controllers. Examples of suitable networks 614 include networks utilizing wired and/or wireless communication technologies and networks operating in accordance with any suitable networking and/or communication protocol (e.g., the Internet).

The distributed computing service/platform (which may also be referred to as a multi-tenant data processing platform) 608 may include multiple processing tiers, including a user interface tier 616, an application server tier 620, and a data storage tier 624. The user interface tier 616 may maintain multiple user interfaces 617, including graphical user interfaces and/or web-based interfaces. The user interfaces may include a default user interface for the service to provide access to applications and data for a user or "tenant" of the service (depicted as "Service UI" in the figure), as well as one or more user interfaces that have been specialized/customized in accordance with user specific requirements (e.g., represented by "Tenant A UI", . . . , "Tenant Z UI" in the figure, and which may be accessed via one or more APIs).

The default user interface may include user interface components enabling a tenant to administer the tenant's access to and use of the functions and capabilities provided by the service platform. This may include accessing tenant data, launching an instantiation of a specific application, causing the execution of specific data processing operations, etc. Each application server or processing tier 622 shown in the figure may be implemented with a set of computers and/or components including computer servers and processors, and may perform various functions, methods, processes, or operations as determined by the execution of a software application or set of instructions. The data storage tier 624 may include one or more data stores, which may include a Service Data store 625 and one or more Tenant Data stores 626. Data stores may be implemented with any suitable data storage technology, including structured query language (SQL) based relational database management systems (RDBMS).

Service Platform 608 may be multi-tenant and may be operated by an entity to provide multiple tenants with a set of business-related or other data processing applications, data storage, and functionality. For example, the applications and functionality may include providing web-based access to the functionality used by a business to provide services to end-users, thereby allowing a user with a browser and an Internet or intranet connection to view, enter, process, or modify certain types of information. Such functions or applications are typically implemented by one or more modules of software code/instructions that are maintained on and executed by one or more servers 622 that are part of the platform's Application Server Tier 620. As noted with regards to FIG. 5, the platform system shown in FIG. 6 may be hosted on a distributed computing system made up of at least one, but typically multiple, "servers."

As mentioned, rather than build and maintain such a platform or system themselves, a business may utilize systems provided by a third party. A third party may implement a business system/platform as described above in the context of a multi-tenant platform, where individual instantiations of a business' data processing workflow (such as the data processing described herein) are provided to users, with each company/business representing a tenant of the platform. One advantage to such multi-tenant platforms is the ability for each tenant to customize their instantiation of the data processing workflow to that tenant's specific business needs or operational methods. Each tenant may be a business or entity that uses the multi-tenant platform to provide business services and functionality to multiple users.

FIG. 7 is a diagram illustrating additional details of the elements or components of the multi-tenant distributed computing service platform of FIG. 6, in which an embodiment of the invention may be implemented. The software architecture shown in FIG. 7 represents an example of an architecture which may be used to implement an embodiment of the invention. In general, an embodiment of the invention may be implemented using a set of software instructions that are designed to be executed by a suitably programmed processing element (such as a CPU, microprocessor, processor, controller, computing device, etc.). In a complex system such instructions are typically arranged into "modules" with each such module performing a specific task, process, function, or operation. The entire set of modules may be controlled or coordinated in their operation by an operating system (OS) or other form of organizational platform.

As noted, FIG. 7 is a diagram illustrating additional details of the elements or components 700 of a multi-tenant distributed computing service platform, in which an embodiment of the invention may be implemented. The example architecture includes a user interface layer or tier 702 having one or more user interfaces 703. Examples of such user interfaces include graphical user interfaces and application programming interfaces (APIs). Each user interface may include one or more interface elements 704. For example, users may interact with interface elements to access functionality and/or data provided by application and/or data storage layers of the example architecture. Examples of graphical user interface elements include buttons, menus, checkboxes, drop-down lists, scrollbars, sliders, spinners, text boxes, icons, labels, progress bars, status bars, toolbars, windows, hyperlinks, and dialog boxes. Application programming interfaces may be local or remote and may include interface elements such as parameterized procedure calls, programmatic objects, and messaging protocols.

The application layer 710 may include one or more application modules 711, each having one or more sub-modules 712. Each application module 711 or sub-module 712 may correspond to a function, method, process, or operation that is implemented by the module or sub-module (e.g., a function or process related to providing business related data processing and services to a user of the platform). Such function, method, process, or operation may include those used to implement one or more aspects of the inventive system and methods, such as for one or more of the processes or functions described with reference to the Figures:

Training a model (in the form of a Generator that is part of a GAN) to operate on an input tensor representing a spectrogram, image, or other form of signal to produce a more "realistic" tensor as an output, where the training process may include:
Receiving a set of training data, where each example of training data is a spectrogram and is used as an input to the model being trained;
The input to the model may be in the form of a tensor;
The model being trained may be in the form of a Deep Neural Network (DNN), such as a recurrent neural network (RNN) or a convolutional neural network (CNN);
The model generates an output tensor from the input tensor. In one example, this is a waveform predicted from the input;
To improve the model (i.e., to set and modify weights associated with connections between nodes in different layers of the model), performing a comparison between the output tensor and the expected or desired output;
In some embodiments, the expected output is a waveform obtained from a text-to-speech dataset, for example UJ Speech;
In some embodiments, this comparison is used to determine the error or loss between the output tensor and the expected output tensor;
In some embodiments, prior to determining the error or loss, each of the output waveform and the expected waveform (expressed as tensors) are subjected to further processing;
In some embodiments, this further processing is a short-time Fourier Transform (STFT);
The transformed waveforms are used to determine two types of "loss", with the total loss representing a difference or control signal for adjusting the weights of the neural network;
In some embodiments, each of the transformed waveforms is provided as an input to both a process to determine a Lp Norm loss (for example, L1 or L2 loss) and a Discriminator loss (a form of binary classifier, with the loss term expressed as a cost function, such as those illustrated in FIG. 2(*e*));
The resulting output of the process to determine L1 or L2 loss represents the Lp Norm loss, and the resulting output of the Discriminator represents Discriminator Loss;
The Lp Norm Loss and Discriminator Loss are combined to generate the Total Loss from the training cycle;
In one embodiment, the two loss terms are added to generate the total loss term, although other forms of combining the two terms may be used;
The Total Loss is used to update or modify the weights set during the training cycle, typically through backpropagation (although other feedback or adaptive techniques may be used);
Using the trained model with new input data in an inference pipeline;
Once the model weights (such as those connecting nodes in layers of the network/model) have converged to sufficiently stable values, the model may be considered trained;
The trained model may be used as part of the inference pipeline. In a typical use, an input tensor may be provided to the trained model. In response, the model will operate to generate or produce as an output a tensor representing a realistic waveform (or other form of tensor corresponding to the training data and what it represents); and
In some embodiments, the output tensor may then be used as part of a process that converts text-to-speech, generates synthetic speech, generates an image having specific characteristics, processes a signal to identify a signal characteristic or interpret the signal, etc.

The application modules and/or sub-modules may include any suitable computer-executable code or set of instructions (e.g., as would be executed by a suitably programmed processor, microprocessor, or CPU), such as computer-executable code corresponding to a programming language. For example, programming language source code may be compiled into computer-executable code. Alternatively, or in addition, the programming language may be an interpreted programming language such as a scripting language. Each application server (e.g., as represented by element 622 of FIG. 6) may include each application module. Alternatively, different application servers may include different sets of application modules. Such sets may be disjoint or overlapping.

The data storage layer 720 may include one or more data objects 722 each having one or more data object components 721, such as attributes and/or behaviors. For example, the data objects may correspond to tables of a relational database, and the data object components may correspond to columns or fields of such tables. Alternatively, or in addition, the data objects may correspond to data records having fields and associated services. Alternatively, or in addition, the data objects may correspond to persistent instances of programmatic data objects, such as structures and classes. Each data store in the data storage layer may include each data object. Alternatively, different data stores may include different sets of data objects. Such sets may be disjoint or overlapping.

Note that the example computing environments depicted in FIGS. 5-7 are not intended to be limiting examples. Further environments in which an embodiment of the invention may be implemented in whole or in part include devices (including mobile devices), software applications, systems, apparatuses, networks, SaaS platforms, IaaS (infrastructure-as-a-service) platforms, or other configurable components that may be used by multiple users for data entry, data processing, application execution, or data review.

In addition to the described embodiments and implementations, alternative ways of implementing one or more of the data processing operations or functions may include but are not limited to:

- An input in the form of a tensor—this can represent multiple different types of sources, formats, etc., including random numbers;
- In some embodiments, the output is preferably in a form or signal that can be processed using a Fourier transform—for example, an image, waveform, or time-series forecast, expressed in a tensor;
- The model being trained (for example, a Generator in the form of a deep neural network) should be compatible in architecture and input/output format with the input and output forms;
- In a model where the output is expected, the predicted output should be comparable to the expected output. It may also be processed into a comparable format. In other models, the output is random, and there is no expected output;
  - In some embodiments, there are variations where the output may be partially expected. For example, a generative model might be expected to generate a dog without specification of the type of dog. In this case, a classifier might be used instead of Lp-norm, to ensure that the generated image is in-fact a dog.

In addition to those uses described, other possible uses for the solution represented by the disclosure may include but are not limited to:

- Generation of realistic waveforms for purposes of text-to-speech, speech-to-speech, musical-notes-to-music, or noise-to-speech conversions, as non-limiting examples. The disclosed approach is generally applicable to a problem which requires generating an audio signal;
- The approach may also be applied to generating realistic images. As mentioned, synthetic images tend to have spectra that are not realistic. The disclosed approach may be used to generate realistic images that are largely undetectable by conventional techniques;
- GAN models may be used to generate synthetic time series data. The disclosed approach may be used to generate more realistic synthetic time series data, which have applications in training a model to detect and interpret radar backscatter, emitted signals from a transmitter, etc.

In addition to those described, additional examples of "signals" that may be used as part of the processing flow include but are not limited to:

- Audio recording, where an analog pressure wave is sampled and converted to a one-dimensional discrete-time signal;
- Photos/images, where the analog scene of light is sampled using a CCD array and stored as a two-dimensional discrete-space signal;
- Text, where messages are represented with collections of characters; each is as-signed a standard 16-bit number and those are stored in sequence;
- Ratings, where for books (Goodreads), movies (Netflix), vacation rentals (AirBnB) are typically stored using integers (e.g., 0-5); and
- epileptic seizure waveform data, sensed human activity/behaviors modelling, MRI data, emitted or backscatter wavelengths from crops, unmanned aerial vehicle control signals or collected data, etc.

Examples of "waves" or waveforms that may be processed as part of an embodiment include sound waves, light, water waves, and periodic electrical signals in a conductor. A sound wave is a variation in air pressure, while in light and other electromagnetic radiation the strength of the electric and the magnetic field vary. Water waves are variations in the height of a body of water. In a crystal lattice vibration, atomic positions vary and may generate wave phenomena.

In addition to those described forms of models that may be used include:

- RNN (a recurrent neural network) for time-series data;
- CNN (a convolutional neural network) for images; or
- Transformers for images or time-series data;

The Discriminator referenced in the figures and description takes as an input a tensor in the frequency domain. The Discriminator operates to evaluate the output of the Generator (the model being trained) to determine how close the output is to real data. The Discriminator produces a loss factor given an input of fake data. In a GAN framework, the Generator typically tries to maximize the loss. In one embodiment, an approach used with a DCGAN[11] may be used to train a Discriminator, although there are other approaches that may be used to train a Discriminator.

[11] A Deep Convolutional GAN or DCGAN is a direct extension of the GAN concept, except that it explicitly uses convolutional and transpose-convolutional layers in the discriminator and generator, respectively. The discriminator is made up of strided convolution layers, batch norm layers, and LeakyReLU activations without max-pooling layers i.e., convolution>batch norm>leaky ReLU.

As further examples of the use of the disclosed processing flow to generate a more realistic waveform:

- start with text—then generate a spectrogram, input the spectrogram to a trained model to generate a waveform, and use the waveform to generate speech, followed by using the generated speech as part of delivering a service, etc.;
- as examples, ways in which generated speech, or the model output (a more realistic waveform) might be used include:
  - The model may be used to generate music, or a sound (animal sounds, speech disfluencies, breathing sounds, etc.);
  - The model may be used as part of a speech-to-speech service;
  - The model may be used as part of a voice editing service for post-production situations;

The model may be used for brain wave to speech conversion (e.g., for those suffering from an accident or debilitating disease);

The model input may be notes for music generation, speech for speech-to-speech, or random noise for unconditional generation, as examples;

speech-to-speech use cases may include:
- Voice changing;
- Compression;
- Removing disfluencies; or
- Removing background noise (noise-canceling).

In addition to those described, implementation options or variations may include the following for the indicated element, component, or process:

For the use of back-propagation or other form of adaptive control or feedback;

The models described herein may, in some embodiments, be trained with an alternative feedback mechanism to backpropagation. These alternate mechanisms may include:
- Difference Target Propagation;
- The HSIC Bottleneck;
- Online Alternative Minimization with Auxiliary Variables;
- Decoupled Neural Interfaces Using Synthetic Gradients;
- REINFORCE; or
- Random Search;

The model weights can be tuned with a variety of gradient estimators. In some embodiments, the weights can be tuned without consideration for the gradient, using methods such as random search or grid search;

For the use of the STFT;

This can be replaced by other types of Fourier Transform. An STFT is generally specific to time series data. For images, it is not necessary to use a "Short-time Fourier transform". In one example, a "Discrete-time Fourier Transform" may be used;

A cosine transform can be used in-place of a Fourier transform, as well. In a similar way, other Fourier-related transforms can be used to transform a signal from the time domain into the frequency domain;

For the use of a Discriminator;

This can be another type of model or process that is able to detect "fake" data examples. For example, one could use a pre-trained ASR model for the discrimination function;

There are ways to train a Discriminator that do not involve directly classifying examples into fake or real. For example, a WGAN architecture introduces a Wasserstein loss for training the Discriminator;

The Discriminator typically needs to provide some sort of process for updating the Generator weights. This process helps ensure that the Generator output is similar to the training data examples;

As another example, a technique termed "Feature matching" may be used. This technique changes the cost function for the Generator to minimize the statistical difference between the features of the real images and the generated images. In this example, the Discriminator extracts features, and those features are analyzed for a statistical difference between the real and generated examples. In this case, the Discriminator is not functioning as a binary classifier; however, it is still providing a signal based on if the generated examples exist in the target distribution (see https://towardsdatascience.com/gan-ways-to-improve-gan-performance-acf37f9f59b);

While conventionally, a Discriminator is a binary classifier, it is not required to be one or to operate in that manner. More generally, a Discriminator is a model of the "true data distribution". The Generator uses the Discriminator to obtain feedback on if a generated sample is part of the "true data distribution". For example, a speech-to-text model could be used to Discriminate the generated waveforms;

The Discriminator does not have to be trained in a DCGAN approach. In some embodiments, the Discriminator is not trained at all. For example, for tabular data, it is feasible to create a simple Discriminator which is not a Deep Neural Network. The Discriminator could also be pre-trained on the "true data distribution". A pre-trained Discriminator does not have to be further updated with examples of "real" data;

While conventionally, the Discriminator is differentiable, it is not required to be. In some embodiments, the Discriminator is not trained with backdrop, and therefore, it does not need to be differentiable;

For the use of L1 or L2 (Lp) Norm loss factors;
L1 is loss=(x−y)
L2 is loss=(x−y)$^2$ In general, almost any algorithm, formula, or approach that directly compares and measures the difference between x and y can be used. There are many different mechanisms for measuring the difference between two tensors. They include simple polynomial functions and more complex Deep Neural Networks, as examples;

In some embodiments, a total loss factor is computed or determined from Spectrogram Loss and Discriminator Loss by adding the two loss factors or values together. Usually, there are weights applied when they are added together, such as in the form of $x*w_1+y*w_2$.

As disclosed, in some embodiments, a Generator model processes the input to generate an output which is a signal/waveform. A signal processing algorithm, such as a Fourier transform, is then applied to transform the output signal into a frequency-domain representation. Lastly, a Discriminator processes the frequency-domain representation of the signal and determines if it is a "realistic" example of the signal/waveform.[12]

[12] One motivation for the disclosed processing flow is that conventional models for generating waveforms do not produce realistic outputs. For example, this paper describes some of the errors these models produce: https://arxiv.org/pdf/2010.14356.pdf. As noted in the paper's abstract, "A number of recent advances in neural audio synthesis rely on up-sampling layers, which can introduce undesired artifacts. In computer vision, up-sampling artifacts have been studied and are known as checkerboard artifacts (due to their characteristic visual pattern). However, their effect has been overlooked so far in audio processing. Here, we address this gap by studying this problem from the audio signal processing perspective. We first show that the main sources of up-sampling artifacts are: (i) the tonal and filtering artifacts introduced by problematic up-sampling operators, and (ii) the spectral replicas that emerge while up-sampling. We then compare different up-sampling layers, showing that nearest neighbor up-sampler(s) can be an alternative to the problematic (but state-of-the-art) transposed and subpixel convolutions which are prone to introduce tonal artifacts".

The Generator model which processes the input can be a conditional or unconditional generator:

A conditional generator model needs some sort of input that correlates with the output. For example:
- Transcription of audio can be mapped back to the audio;
- A stock price is correlated with the stock class;
- A speaker is correlated with the audio pitch and loudness; or A movie rating is correlated with the director of the movie and the budget;

An unconditional generator model takes random noise as the input. For example:

An unconditional generator model can generate random music that is not conditional on an input; or An unconditional generator model can generate random images.

It should be understood that the present invention as described above can be implemented in the form of control logic using computer software in a modular or integrated manner. Based on the disclosure and teachings provided herein, a person of ordinary skill in the art will know and appreciate other ways and/or methods to implement the present invention using hardware and a combination of hardware and software.

In some embodiments, certain of the methods, models or functions described herein may be embodied in the form of a trained neural network, where the network is implemented by the execution of a set of computer-executable instructions or representation of a data structure. The instructions may be stored in (or on) a non-transitory computer-readable medium and executed by a programmed processor or processing element. The set of instructions may be conveyed to a user through a transfer of instructions or an application that executes a set of instructions (such as over a network, e.g., the Internet). The set of instructions or an application may be utilized by an end-user through access to a SaaS platform or a service provided through such a platform. A trained neural network, trained machine learning model, or other form of decision or classification process may be used to implement one or more of the methods, functions, processes, or operations described herein. Note that a neural network or deep learning model may be characterized in the form of a data structure in which are stored data representing a set of layers containing nodes, and connections between nodes in different layers are created (or formed) that operate on an input to provide a decision or value as an output.

In general terms, a neural network may be viewed as a system of interconnected artificial "neurons" that exchange messages between each other. The connections have numeric weights that are "tuned" during a training process, so that a properly trained network will respond correctly when presented with an image or pattern to recognize (for example). In this characterization, the network consists of multiple layers of feature-detecting "neurons"; each layer has neurons that respond to different combinations of inputs from the previous layers. Training of a network is performed using a "labelled" dataset of inputs in a wide assortment of representative input patterns that are associated with their intended output response. Training uses general-purpose methods to iteratively determine the weights for intermediate and final feature neurons. In terms of a computational model, each neuron calculates the dot product of inputs and weights, adds the bias, and applies a non-linear trigger or activation function (for example, using a sigmoid response function).

Machine learning (ML) is being used to enable the analysis of data and assist in making decisions in multiple industries. To benefit from using machine learning, a machine learning algorithm is applied to a set of training data and labels to generate a "model" which represents what the application of the algorithm has "learned" from the training data. Each element (or example, in the form of one or more parameters, variables, characteristics or "features") of the set of training data is associated with a label or annotation that defines how the element should be classified by the trained model. A machine learning model is an algorithm that can predict outcomes based on data and training provided to it to make a decision (such as a classification) regarding a sample of input data. When trained, the model will operate on a new element of input data to generate the correct label or classification as an output.

The disclosure includes the following clauses and embodiments:

1. A method for generating a waveform for use as an input to an audio transducer, comprising:

training a model to operate on an input in the form of a spectrogram to generate an output in the form of a waveform, wherein the training further comprises inputting a spectrogram obtained from a source into the model to produce an output waveform corresponding to the source;

transforming the output waveform corresponding to the source into a representation of the output waveform in the frequency domain;

obtaining an actual waveform corresponding to the source;

transforming the actual waveform corresponding to the source into a representation of the actual waveform in the frequency domain;

inputting both the representation of the output waveform corresponding to the source in the frequency domain and the representation of the actual waveform corresponding to the source in the frequency domain into a Discriminator to generate a first loss term corresponding to the discriminator loss;

inputting both the representation of the output waveform corresponding to the source in the frequency domain and the representation of the actual waveform corresponding to the source in the frequency domain into a Lp-Norm loss function to generate a second loss term corresponding to the Lp-Norm loss;

combining the first loss term and the second loss term to produce a total loss term; and using the total loss term to adjust a characteristic of the model;

inputting a spectrogram generated from a different source into the trained model to generate an output waveform corresponding to the different source; and using the output waveform corresponding to the different source as the input to the audio transducer.

2. The method of clause 1, wherein the source is a set of text.

3. The method of clause 2, wherein the spectrogram obtained from the source is obtained by using a text-to spectrogram model.

4. The method of clause 1, wherein transforming the output waveform corresponding to the source into a representation of the output waveform in the frequency domain further comprises using a Short-time Fourier Transform to transform the output waveform.

5. The method of clause 2, wherein obtaining the actual waveform corresponding to the source further comprises obtaining an audio waveform from a text-to-speech generator for the same set of text as used for the source.

6. The method of clause 5, wherein transforming the actual waveform corresponding to the source into a representation of the actual waveform in the frequency domain further comprises using a Short-time Fourier Transform to transform the actual waveform.

7. The method of clause 1, wherein the Lp-Norm loss function is a L1 loss function or a L2 loss function.
8. The method of clause 1, wherein combining the first loss term and the second loss term to produce a total loss term further comprises adding the two loss terms.
9. The method of clause 1, wherein using the total loss term to adjust a characteristic of the model further comprises using the total loss term as part of a feedback or back-propagation mechanism to adjust the characteristic, and wherein the characteristic is a weight that is part of the model.
10. The method of clause 9, wherein the model is a set of layers, with each layer containing a plurality of nodes, with a plurality of connections between a set of nodes in a first layer and a set of nodes in a second layer adjacent to the first layer, and with a set of weights with each weight in the set of weights associated with one of the plurality of connections.
11. The method of clause 1, wherein the model is a Generator that is part of a generative adversarial network, and the Discriminator is part of the generative adversarial network.
12. The method of clause 1, where in the source is one of an image, time-series data, or sampled waveform data and the spectrogram is a tensor representation of the source.
13. A system for generating a waveform for use as an input to an audio transducer, comprising:
one or more electronic processors operable to execute a set of computer-executable instructions; and
the set of computer-executable instructions, wherein when executed, the instructions cause the one or more electronic processors to
train a model to operate on an input in the form of a spectrogram to generate an output in the form of a waveform, wherein the training further comprises
inputting a spectrogram obtained from a source into the model to produce an output waveform corresponding to the source;
transforming the output waveform corresponding to the source into a representation of the output waveform in the frequency domain;
obtaining an actual waveform corresponding to the source;
transforming the actual waveform corresponding to the source into a representation of the actual waveform in the frequency domain;
inputting both the representation of the output waveform corresponding to the source in the frequency domain and the representation of the actual waveform corresponding to the source in the frequency domain into a Discriminator to generate a first loss term corresponding to the discriminator loss;
inputting both the representation of the output waveform corresponding to the source in the frequency domain and the representation of the actual waveform corresponding to the source in the frequency domain into a Lp-Norm loss function to generate a second loss term corresponding to the Lp-Norm loss;
combining the first loss term and the second loss term to produce a total loss term; and
using the total loss term to adjust a characteristic of the model;
input a spectrogram generated from a different source into the trained model to generate an output waveform corresponding to the different source; and
use the output waveform corresponding to the different source as the input to the audio transducer.
14. The system of clause 13, wherein the source is a set of text, the spectrogram obtained from the source is obtained by using a text-to spectrogram model and obtaining the actual waveform corresponding to the source further comprises obtaining an audio waveform from a text-to-speech generator for the same set of text as used for the source.
15. The system of clause 13, wherein transforming the output waveform corresponding to the source into a representation of the output waveform in the frequency domain further comprises using a Short-time Fourier Transform to transform the output waveform and transforming the actual waveform corresponding to the source into a representation of the actual waveform in the frequency domain further comprises using a Short-time Fourier Transform to transform the actual waveform.
16. The system of clause 13, wherein the Lp-Norm loss function is a L1 loss function or a L2 loss function and combining the first loss term and the second loss term to produce a total loss term further comprises adding the two loss terms.
17. The system of clause 13, wherein using the total loss term to adjust a characteristic of the model further comprises using the total loss term as part of a feedback or back-propagation mechanism to adjust the characteristic, the characteristic is a weight that is part of the model, and the model is a set of layers, with each layer containing a plurality of nodes, with a plurality of connections between a set of nodes in a first layer and a set of nodes in a second layer adjacent to the first layer, and with a set of weights with each weight in the set of weights associated with one of the plurality of connections.
18. A set of computer-executable instructions that when executed by one or more programmed electronic processors, cause the processors to generate a waveform by:
training a model to operate on an input in the form of a spectrogram to generate an output in the form of a waveform, wherein the training further comprises
inputting a spectrogram obtained from a source into the model to produce an output waveform corresponding to the source;
transforming the output waveform corresponding to the source into a representation of the output waveform in the frequency domain;
obtaining an actual waveform corresponding to the source;
transforming the actual waveform corresponding to the source into a representation of the actual waveform in the frequency domain;
inputting both the representation of the output waveform corresponding to the source in the frequency domain and the representation of the actual waveform corresponding to the source in the frequency domain into a Discriminator to generate a first loss term corresponding to the discriminator loss;
inputting both the representation of the output waveform corresponding to the source in the frequency domain and the representation of the actual waveform corresponding to the source in the frequency domain into a Lp-Norm loss function to generate a second loss term corresponding to the Lp-Norm loss;

combining the first loss term and the second loss term to produce a total loss term; and using the total loss term to adjust a characteristic of the model.

19. The set of computer-executable instructions of clause 18, wherein the source is a set of text, the spectrogram obtained from the source is obtained by using a text-to spectrogram model and obtaining the actual waveform corresponding to the source further comprises obtaining an audio waveform from a text-to-speech generator for the same set of text as used for the source, and the set of instructions cause the processors to receive a spectrogram generated from a different source as an input to the trained model to generate an output waveform corresponding to the different source and use the output waveform corresponding to the different source as an input to an audio transducer.

20. The set of computer-executable instructions of clause 18, wherein transforming the output waveform corresponding to the source into a representation of the output waveform in the frequency domain further comprises using a Short-time Fourier Transform to transform the output waveform and transforming the actual waveform corresponding to the source into a representation of the actual waveform in the frequency domain further comprises using a Short-time Fourier Transform to transform the actual waveform.

21. The set of computer-executable instructions of clause 18, wherein using the total loss term to adjust a characteristic of the model further comprises using the total loss term as part of a feedback or back-propagation mechanism to adjust the characteristic, the characteristic is a weight that is part of the model, and the model is a set of layers, with each layer containing a plurality of nodes, with a plurality of connections between a set of nodes in a first layer and a set of nodes in a second layer adjacent to the first layer, and with a set of weights with each weight in the set of weights associated with one of the plurality of connections.

Any of the software components, processes or functions described in this application may be implemented as software code to be executed by a processor using any suitable computer language such as Python, Java, JavaScript, C, C++, or Perl using conventional or object-oriented techniques. The software code may be stored as a series of instructions, or commands in (or on) a non-transitory computer-readable medium, such as a random-access memory (RAM), a read only memory (ROM), a magnetic medium such as a hard-drive or a floppy disk, or an optical medium such as a CD-ROM. In this context, a non-transitory computer-readable medium is almost any medium suitable for the storage of data or an instruction set aside from a transitory waveform. Any such computer readable medium may reside on or within a single computational apparatus and may be present on or within different computational apparatuses within a system or network.

According to one example implementation, the term processing element or processor, as used herein, may be a central processing unit (CPU), or conceptualized as a CPU (such as a virtual machine). In this example implementation, the CPU or a device in which the CPU is incorporated may be coupled, connected, and/or in communication with one or more peripheral devices, such as display. In another example implementation, the processing element or processor may be incorporated into a mobile computing device, such as a smartphone or tablet computer.

The non-transitory computer-readable storage medium referred to herein may include a number of physical drive units, such as a redundant array of independent disks (RAID), a floppy disk drive, a flash memory, a USB flash drive, an external hard disk drive, thumb drive, pen drive, key drive, a High-Density Digital Versatile Disc (HD-DVD) optical disc drive, an internal hard disk drive, a Blu-Ray optical disc drive, or a Holographic Digital Data Storage (HDDS) optical disc drive, synchronous dynamic random access memory (SDRAM), or similar devices or other forms of memories based on similar technologies. Such computer-readable storage media allow the processing element or processor to access computer-executable process steps, application programs and the like, stored on removable and non-removable memory media, to off-load data from a device or to upload data to a device. As mentioned, with regards to the embodiments described herein, a non-transitory computer-readable medium may include almost any structure, technology or method apart from a transitory waveform or similar medium.

Certain implementations of the disclosed technology are described herein with reference to block diagrams of systems, and/or to flowcharts or flow diagrams of functions, operations, processes, or methods. It will be understood that one or more blocks of the block diagrams, or one or more stages or steps of the flowcharts or flow diagrams, and combinations of blocks in the block diagrams and stages or steps of the flowcharts or flow diagrams, respectively, may be implemented by computer-executable program instructions. Note that in some embodiments, one or more of the blocks, or stages or steps may not necessarily need to be performed in the order presented or may not necessarily need to be performed at all.

These computer-executable program instructions may be loaded onto a general-purpose computer, a special purpose computer, a processor, or other programmable data processing apparatus to produce a specific example of a machine, such that the instructions that are executed by the computer, processor, or other programmable data processing apparatus create means for implementing one or more of the functions, operations, processes, or methods described herein. These computer program instructions may also be stored in a computer-readable memory that may direct a computer or other programmable data processing apparatus to function in a specific manner, such that the instructions stored in the computer-readable memory produce an article of manufacture including instruction means that implement one or more of the functions, operations, processes, or methods described herein.

While certain implementations of the disclosed technology have been described in connection with what is presently considered to be the most practical and various implementations, it is to be understood that the disclosed technology is not to be limited to the disclosed implementations. Instead, the disclosed implementations are intended to cover various modifications and equivalent arrangements included within the scope of the appended claims. Although specific terms are employed herein, they are used in a generic and descriptive sense only and not for purposes of limitation.

This written description uses examples to disclose certain implementations of the disclosed technology, and also to enable any person skilled in the art to practice certain implementations of the disclosed technology, including making and using any devices or systems and performing any incorporated methods. The patentable scope of certain implementations of the disclosed technology is defined in the claims, and may include other examples that occur to those skilled in the art. Such other examples are intended to be within the scope of the claims if they have structural and/or functional elements that do not differ from the literal language of the claims, or if they include structural and/or functional elements with insubstantial differences from the literal language of the claims.

All references, including publications, patent applications, and patents, cited herein are hereby incorporated by reference to the same extent as if each reference were individually and specifically indicated to be incorporated by reference and/or were set forth in its entirety herein.

The use of the terms "a" and "an" and "the" and similar referents in the specification and in the following claims are to be construed to cover both the singular and the plural, unless otherwise indicated herein or clearly contradicted by context. The terms "having," "including," "containing" and similar referents in the specification and in the following claims are to be construed as open-ended terms (e.g., meaning "including, but not limited to,") unless otherwise noted. Recitation of ranges of values herein are merely indented to serve as a shorthand method of referring individually to each separate value inclusively falling within the range, unless otherwise indicated herein, and each separate value is incorporated into the specification as if it were individually recited herein. All methods described herein may be performed in any suitable order unless otherwise indicated herein or clearly contradicted by context. The use of any and all examples, or exemplary language (e.g., "such as") provided herein, is intended merely to better illuminate embodiments of the invention and does not pose a limitation to the scope of the invention unless otherwise claimed. No language in the specification should be construed as indicating any non-claimed element as essential to each embodiment of the present invention.

As used herein (i.e., the claims, figures, and specification), the term "or" is used inclusively to refer items in the alternative and in combination.

Different arrangements of the components depicted in the drawings or described above, as well as components and steps not shown or described are possible. Similarly, some features and sub-combinations are useful and may be employed without reference to other features and sub-combinations. Embodiments of the invention have been described for illustrative and not restrictive purposes, and alternative embodiments will become apparent to readers of this patent. Accordingly, the present invention is not limited to the embodiments described above or depicted in the drawings, and various embodiments and modifications may be made without departing from the scope of the claims below.

That which is claimed is:

1. A method for generating a waveform for use as an input to an audio transducer, comprising:
    training a model to operate on an input in the form of a spectrogram to generate an output in the form of a waveform, wherein the training further comprises
        inputting a spectrogram obtained from a source into the model to produce an output waveform corresponding to the source;
        transforming the output waveform corresponding to the source into a representation of the output waveform in the frequency domain;
        obtaining an actual waveform corresponding to the source;
        transforming the actual waveform corresponding to the source into a representation of the actual waveform in the frequency domain;
        inputting both the representation of the output waveform corresponding to the source in the frequency domain and the representation of the actual waveform corresponding to the source in the frequency domain into a Discriminator to generate a first loss term corresponding to the discriminator loss;
        inputting both the representation of the output waveform corresponding to the source in the frequency domain and the representation of the actual waveform corresponding to the source in the frequency domain into a Lp-Norm loss function to generate a second loss term corresponding to the Lp-Norm loss;
        combining the first loss term and the second loss term to produce a total loss term; and
        using the total loss term to adjust a characteristic of the model;
    inputting a spectrogram generated from a different source into the trained model to generate an output waveform corresponding to the different source; and
    using the output waveform corresponding to the different source as the input to the audio transducer.

2. The method of claim 1, wherein the source is a set of text.

3. The method of claim 2, wherein the spectrogram obtained from the source is obtained by using a text-to spectrogram model.

4. The method of claim 2, wherein obtaining the actual waveform corresponding to the source further comprises obtaining an audio waveform from a text-to-speech generator for the same set of text as used for the source.

5. The method of claim 4, wherein transforming the actual waveform corresponding to the source into a representation of the actual waveform in the frequency domain further comprises using a Short-time Fourier Transform to transform the actual waveform.

6. The method of claim 1, wherein transforming the output waveform corresponding to the source into a representation of the output waveform in the frequency domain further comprises using a Short-time Fourier Transform to transform the output waveform.

7. The method of claim 1, wherein the Lp-Norm loss function is a L1 loss function or a L2 loss function.

8. The method of claim 1, wherein combining the first loss term and the second loss term to produce a total loss term further comprises adding the two loss terms.

9. The method of claim 1, wherein using the total loss term to adjust a characteristic of the model further comprises using the total loss term as part of a feedback or back-propagation mechanism to adjust the characteristic, and wherein the characteristic is a weight that is part of the model.

10. The method of claim 9, wherein the model is a set of layers, with each layer containing a plurality of nodes, with a plurality of connections between a set of nodes in a first layer and a set of nodes in a second layer adjacent to the first layer, and with a set of weights with each weight in the set of weights associated with one of the plurality of connections.

11. The method of claim 1, wherein the model is a Generator that is part of a generative adversarial network, and the Discriminator is part of the generative adversarial network.

12. The method of claim 1, where in the source is one of an image, time-series data, or sampled waveform data and the spectrogram is a tensor representation of the source.

13. A system for generating a waveform for use as an input to an audio transducer, comprising:
one or more electronic processors operable to execute a set of computer-executable instructions; and
the set of computer-executable instructions, wherein when executed, the instructions cause the one or more electronic processors to
train a model to operate on an input in the form of a spectrogram to generate an output in the form of a waveform, wherein the training further comprises
inputting a spectrogram obtained from a source into the model to produce an output waveform corresponding to the source;
transforming the output waveform corresponding to the source into a representation of the output waveform in the frequency domain;
obtaining an actual waveform corresponding to the source;
transforming the actual waveform corresponding to the source into a representation of the actual waveform in the frequency domain;
inputting both the representation of the output waveform corresponding to the source in the frequency domain and the representation of the actual waveform corresponding to the source in the frequency domain into a Discriminator to generate a first loss term corresponding to the discriminator loss;
inputting both the representation of the output waveform corresponding to the source in the frequency domain and the representation of the actual waveform corresponding to the source in the frequency domain into a Lp-Norm loss function to generate a second loss term corresponding to the Lp-Norm loss;
combining the first loss term and the second loss term to produce a total loss term; and
using the total loss term to adjust a characteristic of the model;
input a spectrogram generated from a different source into the trained model to generate an output waveform corresponding to the different source; and
use the output waveform corresponding to the different source as the input to the audio transducer.

14. The system of claim 13, wherein the source is a set of text, the spectrogram obtained from the source is obtained by using a text-to spectrogram model and obtaining the actual waveform corresponding to the source further comprises obtaining an audio waveform from a text-to-speech generator for the same set of text as used for the source.

15. The system of claim 13, wherein transforming the output waveform corresponding to the source into a representation of the output waveform in the frequency domain further comprises using a Short-time Fourier Transform to transform the output waveform and transforming the actual waveform corresponding to the source into a representation of the actual waveform in the frequency domain further comprises using a Short-time Fourier Transform to transform the actual waveform.

16. The system of claim 13, wherein the Lp-Norm loss function is a L1 loss function or a L2 loss function and combining the first loss term and the second loss term to produce a total loss term further comprises adding the two loss terms.

17. The system of claim 13, wherein using the total loss term to adjust a characteristic of the model further comprises using the total loss term as part of a feedback or back-propagation mechanism to adjust the characteristic, the characteristic is a weight that is part of the model, and the model is a set of layers, with each layer containing a plurality of nodes, with a plurality of connections between a set of nodes in a first layer and a set of nodes in a second layer adjacent to the first layer, and with a set of weights with each weight in the set of weights associated with one of the plurality of connections.

18. A non-transitory computer-readable medium storing a set of computer-executable instructions that when executed by one or more programmed electronic processors, cause the processors to generate a waveform by:
training a model to operate on an input in the form of a spectrogram to generate an output in the form of a waveform, wherein the training further comprises
inputting a spectrogram obtained from a source into the model to produce an output waveform corresponding to the source;
transforming the output waveform corresponding to the source into a representation of the output waveform in the frequency domain;
obtaining an actual waveform corresponding to the source; transforming the actual waveform corresponding to the source into a representation of the actual waveform in the frequency domain;
inputting both the representation of the output waveform corresponding to the source in the frequency domain and the representation of the actual waveform corresponding to the source in the frequency domain into a Discriminator to generate a first loss term corresponding to the discriminator loss;
inputting both the representation of the output waveform corresponding to the source in the frequency domain and the representation of the actual waveform corresponding to the source in the frequency domain into a Lp-Norm loss function to generate a second loss term corresponding to the Lp-Norm loss;
combining the first loss term and the second loss term to produce a total loss term; and
using the total loss term to adjust a characteristic of the model.

19. The computer-readable medium of claim 18, wherein the source is a set of text, the spectrogram obtained from the source is obtained by using a text-to spectrogram model and obtaining the actual waveform corresponding to the source further comprises obtaining an audio waveform from a text-to-speech generator for the same set of text as used for the source, and the set of instructions cause the processors to receive a spectrogram generated from a different source as an input to the trained model to generate an output waveform corresponding to the different source and use the output waveform corresponding to the different source as an input to an audio transducer.

20. The computer-readable medium of claim 18, wherein transforming the output waveform corresponding to the source into a representation of the output waveform in the frequency domain further comprises using a Short-time Fourier Transform to transform the output waveform and transforming the actual waveform corresponding to the source into a representation of the actual waveform in the frequency domain further comprises using a Short-time Fourier Transform to transform the actual waveform.

* * * * *